US011337159B2

(12) United States Patent
Gao et al.

(10) Patent No.: US 11,337,159 B2
(45) Date of Patent: May 17, 2022

(54) DYNAMIC UPLINK TARGET RECEIVE POWER ADJUSTMENT FOR UPLINK INTERFERENCE MITIGATION

(71) Applicant: Telefonaktiebolaget LM Ericsson (publ), Stockholm (SE)

(72) Inventors: Shiwei Gao, Nepean (CA); Xingqin Lin, Santa Clara, CA (US); Siva Muruganathan, Stittsville (CA); Vijaya Yajnanarayana, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/650,602

(22) PCT Filed: Sep. 28, 2018

(86) PCT No.: PCT/IB2018/057586
§ 371 (c)(1),
(2) Date: Mar. 25, 2020

(87) PCT Pub. No.: WO2019/064273
PCT Pub. Date: Apr. 4, 2019

(65) Prior Publication Data
US 2021/0136694 A1   May 6, 2021

Related U.S. Application Data

(60) Provisional application No. 62/565,977, filed on Sep. 29, 2017.

(51) Int. Cl.
*H04W 52/14* (2009.01)
*H04W 52/08* (2009.01)
(Continued)

(52) U.S. Cl.
CPC ......... *H04W 52/146* (2013.01); *H04W 52/08* (2013.01); *H04W 52/245* (2013.01); *H04W 52/248* (2013.01); *H04W 84/005* (2013.01)

(58) Field of Classification Search
CPC ............. H04W 52/146; H04W 52/242; H04W 52/243; H04W 52/283; H04W 4/02;
(Continued)

(56) References Cited

U.S. PATENT DOCUMENTS

2020/0389766 A1* 12/2020 Kim ..................... H04L 5/0048

FOREIGN PATENT DOCUMENTS

CN      103037488 B    10/2015
EP       2874447 A1     5/2015
(Continued)

OTHER PUBLICATIONS

Author Unknown, "Technical Specification Group Radio Access Network; Study on Enhanced LTE Support for Aerial Vehicles (Release 15)," Technical Report 36.777, Version 0.1.0, 3GPP Organizational Partners, Jul. 2017, 12 pages.
(Continued)

*Primary Examiner* — Philip Sobutka
(74) *Attorney, Agent, or Firm* — Withrow & Terranova, PLLC

(57) ABSTRACT

Embodiments of a network node for a cellular communications network are disclosed. In some embodiments, the network node comprises a radio interface and processing circuitry operable to configure a wireless device to measure Reference Signal Received Power (RSRP) for both a serving cell of the wireless device and one or more neighbor cells of the wireless device, receive resulting reporting information from the wireless device, adjust a target receive power for the wireless device based on the reporting information, determine a power correction for the wireless device based
(Continued)

on the adjusted target receive power for the wireless device, and signal the power correction to the wireless device. Embodiments of a method of operation of a network node as well as embodiments of a wireless device and a method of operation thereof are also disclosed.

19 Claims, 14 Drawing Sheets

(51) Int. Cl.
*H04W 52/24* (2009.01)
*H04W 84/00* (2009.01)

(58) Field of Classification Search
CPC ..... H04W 52/06; H04W 52/08; H04W 52/10; H04W 52/12; H04W 52/241; H04W 52/245; H04W 52/248; H04W 84/005; H04B 7/18506; B64C 39/024; B64C 2201/122
See application file for complete search history.

(56) References Cited

FOREIGN PATENT DOCUMENTS

| | | |
|---|---|---|
| EP | 2991413 A1 | 3/2016 |
| EP | 3125618 A1 | 2/2017 |
| WO | 2017065655 A1 | 4/2017 |

OTHER PUBLICATIONS

Author Unknown, "Technical Specification Group Radio Access Network; Evolved Universal Terrestrial Radio Access (E-UTRA); Physical layer procedures (Release 14)," Technical Specification 36.213, Version 14.3.0, 3GPP Organizational Partners, Jun. 2017, 460 pages.

NTT Docomo, "R1-1713889: Initial views on interference mitigation schemes for aerials," Third Generation Partnership Project (3GPP), TSG RAN WG1 Meeting #90, Aug. 21-25, 2017, 3 pages, Prague, Czechia.

Qualcomm Incorporated, "R1-1708813: System level performance and interference mitigation techniques for aerial vehicles," Third Generation Partnership Project (3GPP), TSG RAN WG1 Meeting #89, May 15-19, 2017, 5 pages, Hangzhou, P.R. China.

ZTE, "R1-1714466: Potential enhancements on interference mitigation," Third Generation Partnership Project (3GPP), TSG RAN WG1 Meeting #90, Aug. 21-25, 2017, 5 pages, Prague, Czechia.

Invitation to Pay Additional Fees and Partial Search for International Patent Application No. PCT/IB2018/057586, mailed Nov. 27, 2018, 14 pages.

International Search Report and Written Opinion for International Patent Application No. PCT/IB2018/057586, dated Jan. 21, 2019, 19 pages.

* cited by examiner

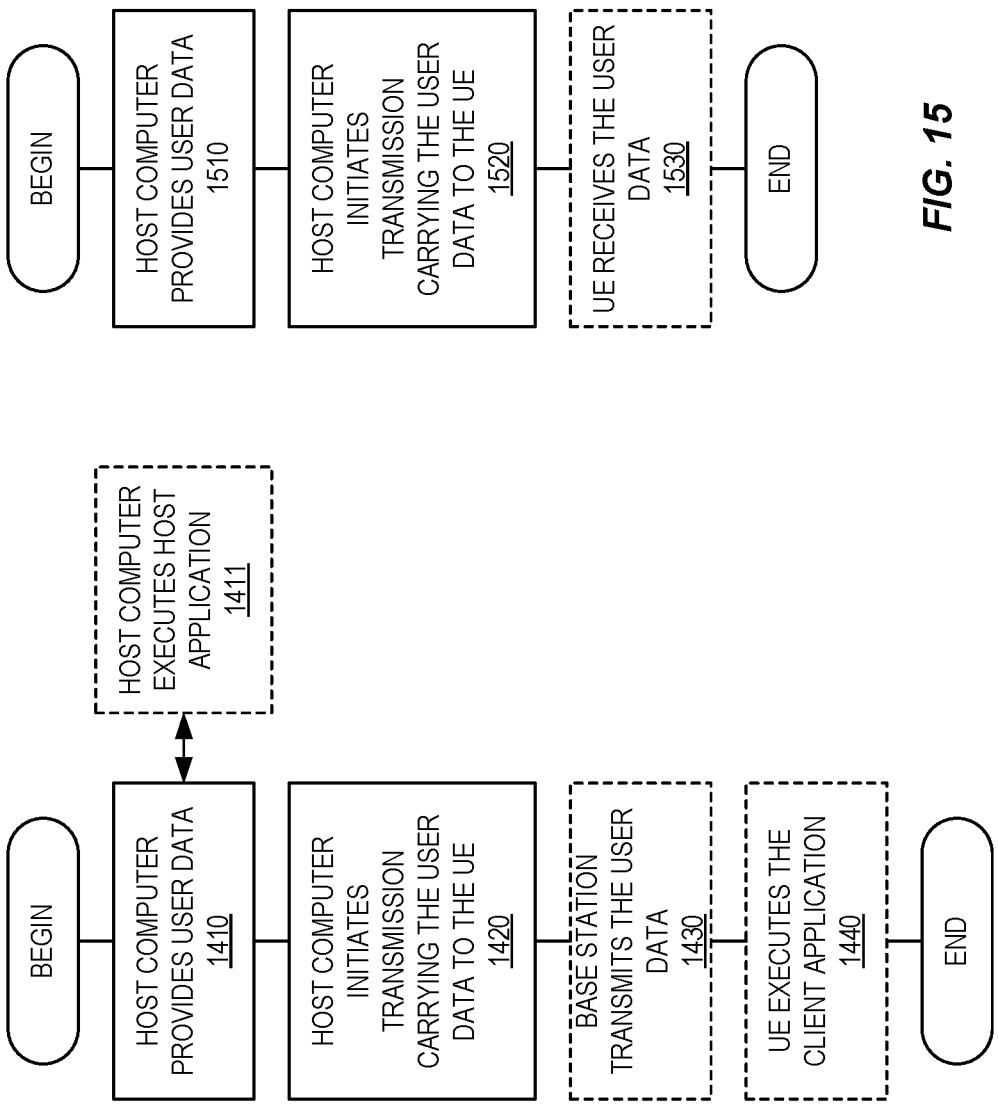

DYNAMIC UPLINK TARGET RECEIVE POWER ADJUSTMENT FOR UPLINK INTERFERENCE MITIGATION

RELATED APPLICATIONS

This application is a 35 U.S.C. § 371 national phase filing of International Application No. PCT/IB2018/057586, filed Sep. 28, 2018, which claims the benefit of provisional patent application Ser. No. 62/565,977, filed Sep. 29, 2017, the disclosures of which are hereby incorporated herein by reference in their entireties.

TECHNICAL FIELD

The present disclosure relates to uplink power control in a cellular communications network.

BACKGROUND

Third Generation Partnership Project (3GPP) Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 milliseconds (ms), each radio frame consisting of ten equally-sized subframes of length $T_{subframe}=1$ ms, as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the Evolved or Enhanced Node B (eNB) transmits Downlink Control Information (DCI) about User Equipment devices (UEs) to which data is transmitted and resource blocks upon which the data is transmitted, in the current downlink subframe. This control signaling is typically transmitted in the first 1, 2, 3, or 4 OFDM symbols in each subframe through Physical Downlink Control Channel (PDCCH). A downlink system with 3 OFDM symbols as control is illustrated in FIG. 3.

LTE uses Hybrid Automatic Repeat Request (HARQ), where, after receiving downlink data in a subframe, the UE attempts to decode it and reports to the eNB whether the decoding was successful (i.e., Acknowledgement (ACK)) or not (i.e., Negative Acknowledgement (NACK)). In case of an unsuccessful decoding attempt, the eNB can retransmit the erroneous data.

Uplink control signaling from the UE to the eNB consists of:
 HARQ acknowledgements for received downlink data;
 UE reports related to the downlink channel conditions, used as assistance for the downlink scheduling;
 scheduling requests, indicating that a UE needs uplink resources for uplink data transmissions.

If the UE has not been assigned an uplink resource for data transmission, the L1/L2 control information (channel-status information reports, HARQ acknowledgments, and scheduling requests) is transmitted in uplink resources (resource blocks) specifically assigned for uplink L1/L2 control on Physical Uplink Control Channel (PUCCH). FIG. 4 illustrates uplink L1/L2 control signaling transmission on PUCCH. As illustrated in FIG. 4, these resources are located at the edges of the total available cell bandwidth. Each such resource consists of twelve "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

To transmit data in the uplink, the terminal is signaled with an uplink grant including an uplink resource and other transmission parameters such as modulation and coding rate and transmit power command for data transmission on the Physical Uplink Shared Channel (PUSCH). The uplink grant is sent to a UE using either DCI format 0 or DCI format 4 and is carried on PDCCH. FIG. 5 shows an example of PUSCH resource assignment to two users (denoted as User #1 and User #2). The middle symbol in each slot is used to transmit a reference symbol. If the UE has been assigned an uplink resource for data transmission and at the same time instance has control information to transmit, it will transmit the control information together with the data on PUSCH.

UEs attached to drones or other aerial vehicles flying in the sky can cause uplink interference in neighbor cells due to high probability of Line-of-Sight (LOS) conditions to neighbor cells. When such UEs transmit signals to a serving eNB or network node on the ground, the signals will also reach neighbor eNBs with comparable level of received signal power, which can cause interference to UEs being served by the neighbor cells. An example is shown in FIG. 6, where UE3 on a drone is served by eNB3 and can cause interference to eNB1 which is receiving an uplink signal from UE1 and also cause interference to eNB2 which is receiving an uplink signal from UE2 in neighbor cells. Note that even though the example in FIG. 6 shows UE3 on a drone, the interference issue described in the example is also present in case UE3 itself is a drone UE.

Such uplink interference needs to be controlled/mitigated in order to enable services to UEs attached to drones or drone UEs in existing cellular networks.

A number of solutions have been proposed in 3GPP studies on serving aerial vehicles by existing terrestrial LTE networks. Most of them are related to uplink power control. In LTE, one of the power control methods for PUSCH on a serving carrier, c, is given by the formula below in Equation 1 [2]. Note that the formula in Equation 1 is applicable when the UE does not transmit other channels with PUSCH in subframe i'

$$P_{PUSCH,c}(i') = \min\begin{cases} P_{CMAX,c}(i'), \\ 10\log_{10}(M_{PUSCH,c}(i')) + P_{O\_PUSCH,c} + \\ \alpha_c \cdot PL_c + \Delta_{TF,c}(i') + f_c(i') \end{cases} \quad \text{Equation 1}$$

where
 $P_{CMAX,c}(i')$ is the configured maximum UE transmit power in Decibel-Milliwatts (dBm).

$M_{PUSCH,c}(i')$ is the bandwidth of the PUSCH resource assignment expressed in number of resource blocks valid for subframe i' and serving cell c.

$P_{O\_PUSCH,c}$ is a target receive power in dBm composed of the sum of a cell specific component $P_{O\_NOMINAL\_PUSCH,c}$ and a UE specific component $P_{O\_UE\_PUSCH,c}$ for serving cell c.

$\alpha_c \in \{0, 0.4, 0.5, 0.6, 0.7, 0.8, 0.9, 1\}$ is a fractional power control parameter for serving cell c.

$PL_c$ is the downlink pathloss estimate calculated in the UE for serving cell c in Decibels (dB) and $PL_c$=referenceSignalPower−higher layer filtered Reference Signal Received Power (RSRP), where referenceSignalPower is signaled to the UE by the network node and RSRP is the reference signal received power at the UE from the serving cell.

$\Delta_{TF,c}(i')$ is a modulation and coding rate related offset which can be used to ensure that the received Signal to Interference plus Noise Ratio (SINR) matches the SINR required for a given Modulation and Coding Scheme (MCS) that is the PUSCH data rate selected by the eNB. It is also possible to set $\Delta_{TF,c}(i')$ to zero in which case the PUSCH received power will be matched to a certain MCS given by the value of $P_{O\_PUSCH,c}$ selected by the eNB.

$f_c(i')=f_c(i'-1)+\delta_{PUSCH,c}(i'-K_{PUSCH})$ is the current PUSCH power control adjustment state for serving cell c if accumulation is enabled and $f_c(i')=\delta_{PUSCH,c}(i'-K_{PUSCH})$ if accumulation is not enabled. $\delta_{PUSCH,c}(i'-K_{PUSCH})$ is a correction value, also referred to as a Transmit Power Control (TPC) command, signaled to the UE at subframe $i'-K_{PUSCH}$ in an uplink grant over PDCCH. $K_{PUSCH}$ equals 4 for Frequency Division Duplexing (FDD) systems.

The formula is used by a UE to determine its PUSCH transmit power. The power adjustment consists of two parts: an open loop adjustment, $10\log_{10}(M_{PUSCH,c}(i'))+P_{O\_PUSCH,c}+\alpha_c \cdot PL_c+\Delta_{TF,c}(i')$, and a closed loop part, $f_c(i')$. The open loop part is used by a UE to estimate the approximate transmit power based on the pathloss estimation $PL_c$, the allocated PUSCH bandwidth $M_{PUSCH,c}(i')$, the modulation and coding rate, and the target receive power $P_{O\_PUSCH,c}$. The closed loop power control is used for fine-tuning the UE transmit power based on the target receive signal power $P_{O\_PUSCH,c}$ and the actual received PUSCH power at the network node.

In LTE, uplink power control is also performed for PUCCH, Sounding Reference Signal (SRS), and Physical Random Access Channel (PRACH). The power control for SRS is the same for PUSCH except a configurable offset. Power control for PUCCH uses an independent power control loop and can be found in Section 5 in 3GPP Technical Specification (TS) 36.213 [2]. PRACH power control can be found in Section 6.1 in TS 36.213 [3].

In one proposal [1] for uplink interference mitigation for drone UEs, instead of using the serving cell RSRP and pathloss $PL_c$, a drone UE measures RSRP from multiple neighbor cells and uses the combined serving cell RSRP and neighbor cell RSRPs for pathloss compensation in uplink power control.

In another proposal [4][5], instead of cell specific $\alpha_c$ and $P_{CMAX,c}(i')$, uplink power control with a UE specific fractional power control factor and/or UE specific transmit power for drone UEs were proposed.

The existing solutions for controlling or mitigating inference caused by aerial UEs (e.g., drone UEs) are less than ideal. As such, there is a need for improved solutions for controlling or mitigating interference caused by aerial UEs (e.g., drone UEs).

SUMMARY

Systems and methods are disclosed herein for uplink power control that are particularly beneficial for aerial User Equipment devices (UEs) that control or mitigate interference. Embodiments of a network node for a cellular communications network configured to communicate with a wireless device are disclosed. In some embodiments, the network node comprises a radio interface and processing circuitry operable to configure a wireless device to measure Reference Signal Received Power (RSRP) for both a serving cell of the wireless device and one or more neighbor cells of the wireless device. The processing circuitry is further operable to receive, from the wireless device, reporting information comprising: a serving cell RSRP measurement for the serving cell of the wireless device and a neighbor cell RSRP measurement for a neighbor cell of the wireless device; a RSRP difference between a serving cell RSRP measurement for the serving cell of the wireless device and a neighbor cell RSRP measurement for a neighbor cell of the wireless device; or a plurality of serving cell RSRP measurements for the serving cell of the wireless device and a plurality of neighbor cell RSRP measurements for one or more neighbor cells of the wireless device. The processing circuitry is further operable to adjust a target receive power for the wireless device based on the reporting information, determine a power correction for the wireless device based on the adjusted target receive power for the wireless device, and signal the power correction to the wireless device. In some embodiments, the wireless device is attached to a drone or is a drone UE.

In some embodiments, in order to adjust the target receive power for the wireless device, the processing circuitry is further configured to compute a value, $\Delta P_o$, based on the reporting information, and adjust the target receive power to a value $P_{o,new}=P_o-\Delta P_o$, where $P_o$ is an original target receive power for the wireless device.

In some embodiments, in order to adjust the target receive power for the wireless device, the processing circuitry is further configured to compute a value, $\Delta P_o$, that is a function of a difference between the serving cell RSRP measurement and the neighbor cell RSRP measurement, and adjust the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device and the neighbor cell RSRP measurement for a neighbor cell of the wireless device and, in order to adjust the target receive power for the wireless device, the processing circuitry is further configured to compute a value, $\Delta P_o$, that is a function of a difference between the serving cell RSRP measurement and the neighbor cell RSRP measurement and adjust the target receive power to a value $P_{o,new}=P_o-\Delta P_o$, where $P_o$ is an original target receive power for the wireless device.

In some embodiments, the reporting information comprises the RSRP difference between the serving cell RSRP measurement for the serving cell of the wireless device and the neighbor cell RSRP measurement for the neighbor cell of the wireless device and, in order to adjust the target receive power for the wireless device, the processing circuitry is further configured to compute a value, $\Delta P_o$, that is a function of the RSRP difference and adjust the target receive power to a value $P_{o,new}=P_o-\Delta P_o$, where $P_o$ is an original target receive power for the wireless device.

In some embodiments, in order to adjust the target receive power for the wireless device, the processing circuitry is further configured to compute a pathloss of the serving cell and a pathloss of the neighbor cell based on the reporting information, compute a value, $\Delta P_o$, as a function of a difference between the pathloss of the serving cell and the pathloss of the neighbor cell, and adjust the target receive power to a value $P_{o,new}=P_o-\Delta P_o$, where $P_o$ is an original target receive power for the wireless device.

In some embodiments, in order to adjust the target receive power for the wireless device, the processing circuitry is further configured to compute a pathloss of the serving cell and pathlosses of two or more neighbor cells based on the reporting information, compute a value, $\Delta P_o$, as a function of a pathloss difference, $\Delta PL$, where the pathloss difference, $\Delta PL$, is defined as: $\Delta P_L=\text{maximum}\ \{PL_{neib}(i)-PL_{sev},\ i=1,\ldots,K\}$ where $PL_{neib}(i)$ is the pathloss of an i-th neighbor cell of the two or more neighbor cells, $PL_{sev}$ is the pathloss of the serving cell, and K is the number of neighbor cells, and adjust the target receive power to a value $P_{o,new}=P_o-\Delta P_o$, where $P_o$ is an original target receive power for the wireless device.

In some embodiments, in order to adjust the target receive power for the wireless device, the processing circuitry is further configured to compute a value, $\Delta P_o$, as:

$$\Delta P_o=\alpha_{neib}\times\text{maximum}\{RSRP_{neib}(i), i=1,\ldots,K\}, \text{ or}$$

$$\Delta P_o=\alpha_{neib}\times\text{maximum}\{PL_{neib}(i), i=1,\ldots,K\}),$$

where $\alpha_{neib}$ is a scaling factor associated with a strongest neighbor cell that is used to compute the value $\Delta P_o$, $RSRP_{neib}(i)$ is a RSRP measurement for an i-th neighbor cell of K neighbor cells of the wireless device, and $PL_{neib}(i)$ is a pathloss of the i-th neighbor cell of the K neighbor cells of the wireless device. In order to adjust the target receive power for the wireless device, the processing circuitry is further configured to adjust the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. In order to adjust the target receive power for the wireless device, the processing circuitry is further configured to compute a value, $\Delta P_o$, as:

$$\Delta P_o=\alpha_{neib}\times\text{maximum}\{RSRP_{neib}(i), i=1,\ldots,K\}),$$

where $\alpha_{neib}$ is a scaling factor associated with a strongest neighbor cell that is used to compute the value $\Delta P_o$, $RSRP_{neib}(i)$ is the neighbor cell RSRP measurement for an i-th neighbor cell of the neighbor cell and the one or more additional neighbor cells, and K is the number of neighbor cells. In order to adjust the target receive power for the wireless device, the processing circuitry is further configured to adjust the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. In order to adjust the target receive power for the wireless device, the processing circuitry is further configured to compute a pathloss of the serving cell, a pathloss of the neighbor cell, and a pathloss of each of the one or more additional neighbor cells based on the reporting information, and compute a value, $\Delta P_o$, as:

$$\Delta P_o=\alpha_{neib}\times\text{maximum}\{PL_{neib}(i), i=1,\ldots,K\}),$$

where $\alpha_{neib}$ is a scaling factor associated with a strongest neighbor cell that is used to compute the value $\Delta P_o$, $PL_{neib}(i)$ is a pathloss of an i-th neighbor cell of the K neighbor cells of the wireless device, and K is the number of neighbor cells. In order to adjust the target receive power for the wireless device, the processing circuitry is further configured to adjust the target receive power to a value $P_{o,new}=P_o-\Delta P_o$, where $P_o$ is an original target receive power for the wireless device.

In some embodiments, in order to adjust the target receive power for the wireless device, the processing circuitry is further configured to compute a value, $\Delta P_o$, as:

$$\Delta P_o=\Sigma_{i=1}^{Kmax}\alpha_{neib,i}\times RSRP_{neib}(i) \text{ or}$$

$$\Delta P_o=\Sigma_{i=1}^{Kmax}\alpha_{neib,i}\times PL_{neib}(i)$$

where $\alpha_{neib,i}$ is a scaling factor associated with the i-th neighbor cell, $RSRP_{neib}(i)$ is a RSRP measurement for the i-th neighbor cell, and $PL_{neib}(i)$ is a pathloss of the i-th neighbor cell. In order to adjust the target receive power for the wireless device, the processing circuitry is further configured to adjust the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. In order to adjust the target receive power for the wireless device, the processing circuitry is further configured to compute a value, $\Delta P_o$, as:

$$\Delta P_o=\Sigma_{i=1}^{Kmax}\alpha_{neib,i}\times RSRP_{neib}(i),$$

where $\alpha_{neib,i}$ is a scaling factor associated with the i-th neighbor cell, and $RSRP_{neib}(i)$ is a RSRP measurement for the i-th neighbor cell. In order to adjust the target receive power for the wireless device, the processing circuitry is further configured to adjust the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. In order to adjust the target receive power for the wireless device, the processing circuitry is further configured to compute a value, $\Delta P_o$, as:

$$\Delta P_o=\Sigma_{i=1}^{Kmax}\alpha_{neib,i}\times PL_{neib}(i),$$

where $\alpha_{neib,i}$ is a scaling factor associated with the i-th neighbor cell, and $PL_{neib}(i)$ is a pathloss of the i-th neighbor cell. In order to adjust the target receive power for the wireless device, the processing circuitry is further configured to adjust the target receive power to a value $P_{o,new}=P_o-\Delta P_o$, where $P_o$ is an original target receive power for the wireless device.

In some embodiments, the configuring further comprises configuring a condition to be used by a wireless device to initiate sending of the reporting information. In some embodiments, the condition is a threshold on a difference between a serving cell RSRP and a neighbor cell RSRP.

In some embodiments, the power correction is signaled to the wireless device via a physical uplink shared channel power control adjustment state $f_c(i)$ with accumulation enabled.

Embodiments of a method implemented in a network node in a wireless communication system are also disclosed. In some embodiments, the method implemented in the network node comprises configuring a wireless device to measure RSRP for both a serving cell of the wireless device and one or more neighbor cells of the wireless device and receiving reporting information from the wireless device, where the reporting information comprises: a serving cell RSRP measurement for the serving cell of the wireless device and a neighbor cell RSRP measurement for a neighbor cell of the wireless device; a RSRP difference between a serving cell RSRP measurement for the serving cell of the wireless device and a neighbor cell RSRP measurement for a neighbor cell of the wireless device; or a plurality of serving cell RSRP measurements for the serving cell of the wireless device and a plurality of neighbor cell RSRP measurements for one or more neighbor cells of the wireless device. The method further comprises adjusting a target receive power for the wireless device based on the reporting information, determining a power correction for the wireless device based on the adjusted target receive power for the wireless device, and signaling the power correction to the wireless device. In some embodiments, the wireless device is attached or a drone or is a drone UE.

In some embodiments, adjusting the target receive power for the wireless device comprises computing a value, $\Delta P_o$, based on the reporting information and adjusting the target receive power to a value $P_{o,new}=P_o\Delta P_o$, where $P_o$ is an original target receive power for the wireless device.

In some embodiments, adjusting the target receive power for the wireless device comprises computing a value, $\Delta P_o$, that is a function of the difference between the serving cell RSRP measurement and the neighbor cell RSRP measurement and adjusting the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device and the neighbor cell RSRP measurement for a neighbor cell of the wireless device, and adjusting the target receive power for the wireless device comprises computing a value, $\Delta P_o$, that is a function of a difference between the serving cell RSRP measurement and the neighbor cell RSRP measurement and adjusting the target receive power to a value $P_{o,new}=P_o-\Delta P_o$, where $P_o$ is an original target receive power for the wireless device.

In some embodiments, the reporting information comprises the RSRP difference between the serving cell RSRP measurement for the serving cell of the wireless device and the neighbor cell RSRP measurement for the neighbor cell of the wireless device, and adjusting the target receive power for the wireless device comprises computing a value, $\Delta P_o$, that is a function of the RSRP difference and adjusting the target receive power to a value $P_{o,new}=P_o-\Delta P_o$, where $P_o$ is an original target receive power for the wireless device.

In some embodiments, adjusting the target receive power for the wireless device comprises computing a pathloss of the serving cell and a pathloss of the neighbor cell based on the reporting information, computing a value, $\Delta P_o$, as a function of a difference between the pathloss of the serving cell and the pathloss of the neighbor cell, and adjusting the target receive power to a value $P_{o,new}=P_o-\Delta P_o$, where $P_o$ is an original target receive power for the wireless device.

In some embodiments, adjusting the target receive power for the wireless device comprises computing a pathloss of the serving cell and pathlosses of two or more neighbor cells based on the reporting information, computing a value, $\Delta P_o$, as a function of a pathloss difference, $\Delta PL$, where the pathloss difference, $\Delta PL$, is defined as: $\Delta PL=\text{maximum}\{PL_{neib}(i)-PL_{sev}, i=1, \ldots, K\}$ where $PL_{neib}(i)$ is the pathloss of an i-th neighbor cell of the two or more neighbor cells, $PL_{sev}$ is the pathloss of the serving cell, and K is the number of neighbor cells, and adjusting the target receive power to a value $P_{o,new}=P_o-\Delta P_o$, where $P_o$ is an original target receive power for the wireless device.

In some embodiments, adjusting the target receive power for the wireless device comprises computing a value, $\Delta P_o$, as:

$$\Delta P_o = \alpha_{new} \times \text{maximum}\{RSRP_{neib}(i), i=1, \ldots, K\}), \text{ or}$$

$$\Delta P_o = \alpha_{new} \times \text{maximum}\{PL_{neib}(i), i=1, \ldots, K\}),$$

where $\alpha_{neib}$ is a scaling factor associated with a strongest neighbor cell that is used to compute the value $\Delta P_o$, $RSRP_{neib}(i)$ is a RSRP measurement for an i-th neighbor cell of K neighbor cells of the wireless device, and $PL_{neib}(i)$ is a pathloss of the i-th neighbor cell of the K neighbor cells of the wireless device. Adjusting the target receive power for the wireless device further comprises adjusting the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. Adjusting the target receive power for the wireless device comprises computing a value, $\Delta P_o$, as:

$$\Delta P_o = \alpha_{neib} \times \text{maximum}\{RSRP_{neib}(i), i=1, \ldots, K\}),$$

where $\alpha_{neib}$ is a scaling factor associated with a strongest neighbor cell that is used to compute the value $\Delta P_o$, $RSRP_{neib}(i)$ is the neighbor cell RSRP measurement for an i-th neighbor cell of the neighbor cell and the one or more additional neighbor cells, and K is the number of neighbor cells. Adjusting the target receive power for the wireless device further comprises adjusting the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. Adjusting the target receive power for the wireless device comprises computing a pathloss of the serving cell, a pathloss of the neighbor cell, and a pathloss of each of the one or more additional neighbor cells based on the reporting information, and computing a value, $\Delta P_o$, as:

$$\Delta P_o = \alpha_{neib} \times \text{maximum}\{PL_{neib}(i), i=1, \ldots, K\}),$$

where $\alpha_{neib}$ is a scaling factor associated with a strongest neighbor cell that is used to compute the value $\Delta P_o$, $PL_{neib}(i)$ is a pathloss of an i-th neighbor cell of the K neighbor cells of the wireless device, and K is the number of neighbor cells. Adjusting the target receive power for the wireless device further comprises adjusting the target receive power to a value $P_{o,new}=P_o-\Delta P_o$, where $P_o$ is an original target receive power for the wireless device.

In some embodiments, adjusting the target receive power for the wireless device comprises computing a value, $\Delta P_o$, as:

$$\Delta P_o = \Sigma_{i=1}^{Kmax} \alpha_{neib,i} \times RSRP_{neib}(i) \text{ or}$$

$$\Delta P_o = \Sigma_{i=1}^{Kmax} \alpha_{neib,i} \times PL_{neib}(i),$$

where $\alpha_{neib,i}$ is a scaling factor associated with the ith neighbor cell, $RSRP_{neib}(i)$ is a RSRP measurement for the i-th neighbor cell, and $PL_{neib}(i)$ is a pathloss of the i-th neighbor cell. Adjusting the target receive power for the wireless device further comprises adjusting the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. Adjusting the target receive power for the wireless device comprises computing a value, $\Delta_o$, as:

$$\Delta P_o = \Sigma_{i=1}^{Kmax} \alpha_{neib,i} \times RSRP_{neib}(i),$$

where $\alpha_{neib,i}$ is a scaling factor associated with the i-th neighbor cell, and $RSRP_{neib}(i)$ is a RSRP measurement for the i-th neighbor cell. Adjusting the target receive power for the wireless device further comprises adjusting the target receive power to a value $P_{o,new}=P_o-\Delta P_o$, where $P_o$ is an original target receive power for the wireless device.

In some embodiments, the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device. Adjusting the target receive power for the wireless device comprises computing a value, $\Delta P_o$, as:

$$\Delta P_o = \Sigma_{i=1}^{Kmax} \alpha_{neib,i} \times PL_{neib}(i),$$

where $\alpha_{neib,i}$ is a scaling factor associated with the i-th neighbor cell, and $PL_{neib}(i)$ is a pathloss of the i-th neighbor cell. Adjusting the target receive power for the wireless device further comprises adjusting the target receive power to a value $P_{o,new}=P_o-\Delta P_o$, where $P_o$ is an original target receive power for the wireless device.

In some embodiments, signaling the power correction comprises signaling the power correction to the wireless device via a physical uplink shared channel power control adjustment state $f_c(i)$ with accumulation enabled.

Embodiments of a wireless device configured to communicate with a network node are also disclosed. In some embodiments, the wireless device comprises a radio interface and processing circuitry configured to receive, from a network node, a configuration to measure RSRP for both a serving cell of the wireless device and one or more neighbor cells of the wireless device, perform RSRP measurements on the serving cell and the one or more neighbor cells, and generate one or more report comprising reporting information. The reporting information comprises a serving cell RSRP measurement for the serving cell of the wireless device and a neighbor cell RSRP measurement for a neighbor cell of the wireless device, a RSRP difference between a serving cell RSRP measurement for the serving cell of the wireless device and a neighbor cell RSRP measurement for a neighbor cell of the wireless device, or a plurality of serving cell RSRP measurements for the serving cell of the wireless device and a plurality of neighbor cell RSRP measurements for one or more neighbor cells of the wireless device. The processing circuitry is further configured to receive a power correction from the network node, determine an uplink transmit power for the wireless device based on the power correction, and perform uplink transmission in accordance with the determined uplink transmit power. In some embodiments, the wireless device is attached or a drone or is a drone UE.

Embodiments of a method implemented in a wireless device are also disclosed. In some embodiments, the method implemented in the wireless device comprises receiving, from a network node, a configuration to measure RSRP for both a serving cell of the wireless device and one or more neighbor cells of the wireless device, performing RSRP measurements on the serving cell and the one or more neighbor cells, and generating one or more reports comprising reporting information. The reporting information comprises a serving cell RSRP measurement for the serving cell of the wireless device and a neighbor cell RSRP measurement for a neighbor cell of the wireless device, a RSRP difference between a serving cell RSRP measurement for the serving cell of the wireless device and a neighbor cell RSRP measurement for a neighbor cell of the wireless device, or a plurality of serving cell RSRP measurements for the serving cell of the wireless device and a plurality of neighbor cell RSRP measurements for one or more neighbor cells of the wireless device. The method further comprises receiving a power correction from the network node, determining an uplink transmit power for the wireless device based on the power correction, performing uplink transmission in accordance with the determined uplink transmit power. In some embodiments, the wireless device is attached or a drone or is a drone UE.

In some other embodiments, a method of operation of a network nodes comprises configuring a wireless device with one or more height-dependent power control parameters.

In some other embodiments, a method of operation of a wireless device comprises determining an uplink transmit power based on a height of the wireless device and one or more height dependent power control parameters, and performing an uplink transmission in accordance with the determined uplink transmit power.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 14 illustrates a flowchart illustrating a method implemented in a communication system according to some embodiments of the present disclosure;

FIG. 15 illustrates a flowchart illustrating a method implemented in a communication system according to some embodiments of the present disclosure;

DETAILED DESCRIPTION

Figure 1:
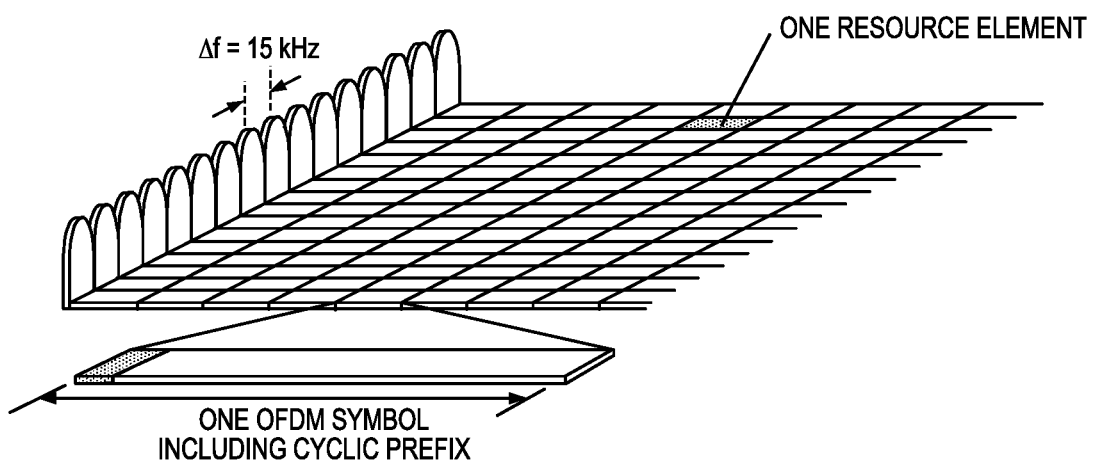
FIG. 1 illustrates the basic Long Term Evolution (LTE) downlink physical resource as a time-frequency grid.
Figure 2:
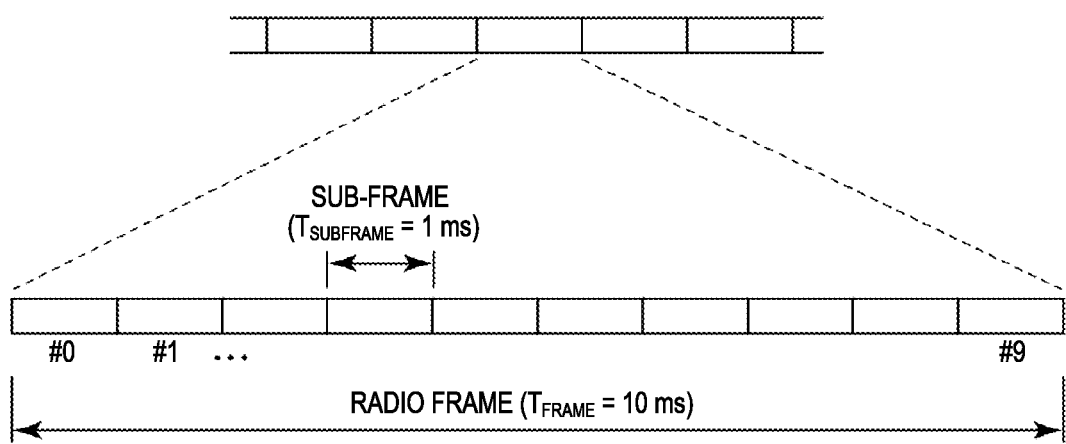
FIG. 2 illustrates LTE downlink transmissions in the time domain.
Figure 3:
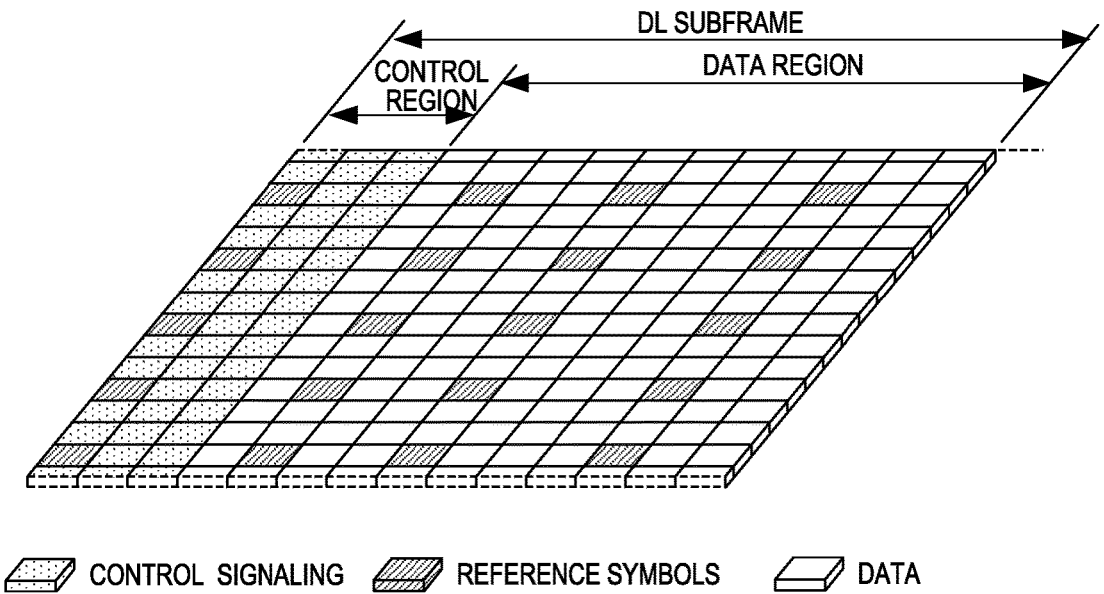
FIG. 3 illustrates a downlink system with three Orthogonal Frequency Division Multiplexing (OFDM) symbols as control.
Figure 4:
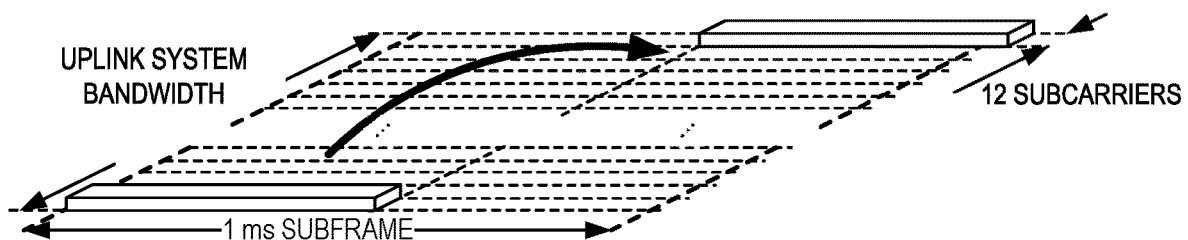
FIG. 4 illustrates resources located at the edges of the total available cell bandwidth.
Figure 5:
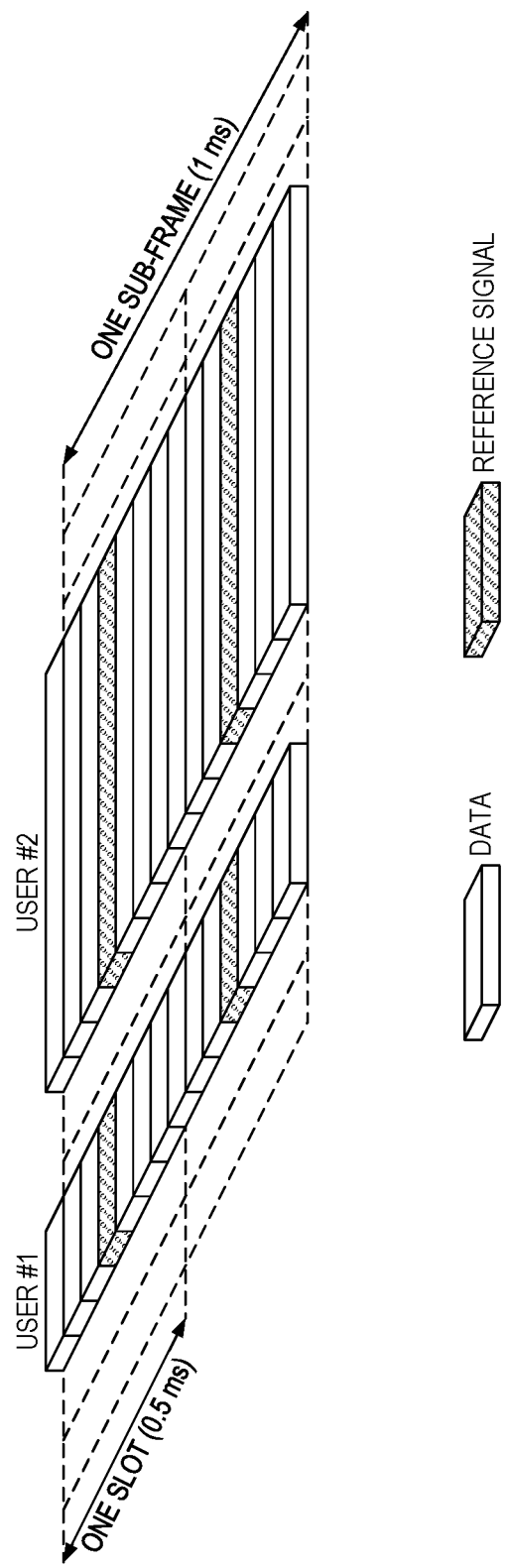
FIG. 5 illustrates an example of Physical Uplink Shared Channel (PUSCH) resource assignment to two users.
Figure 6:
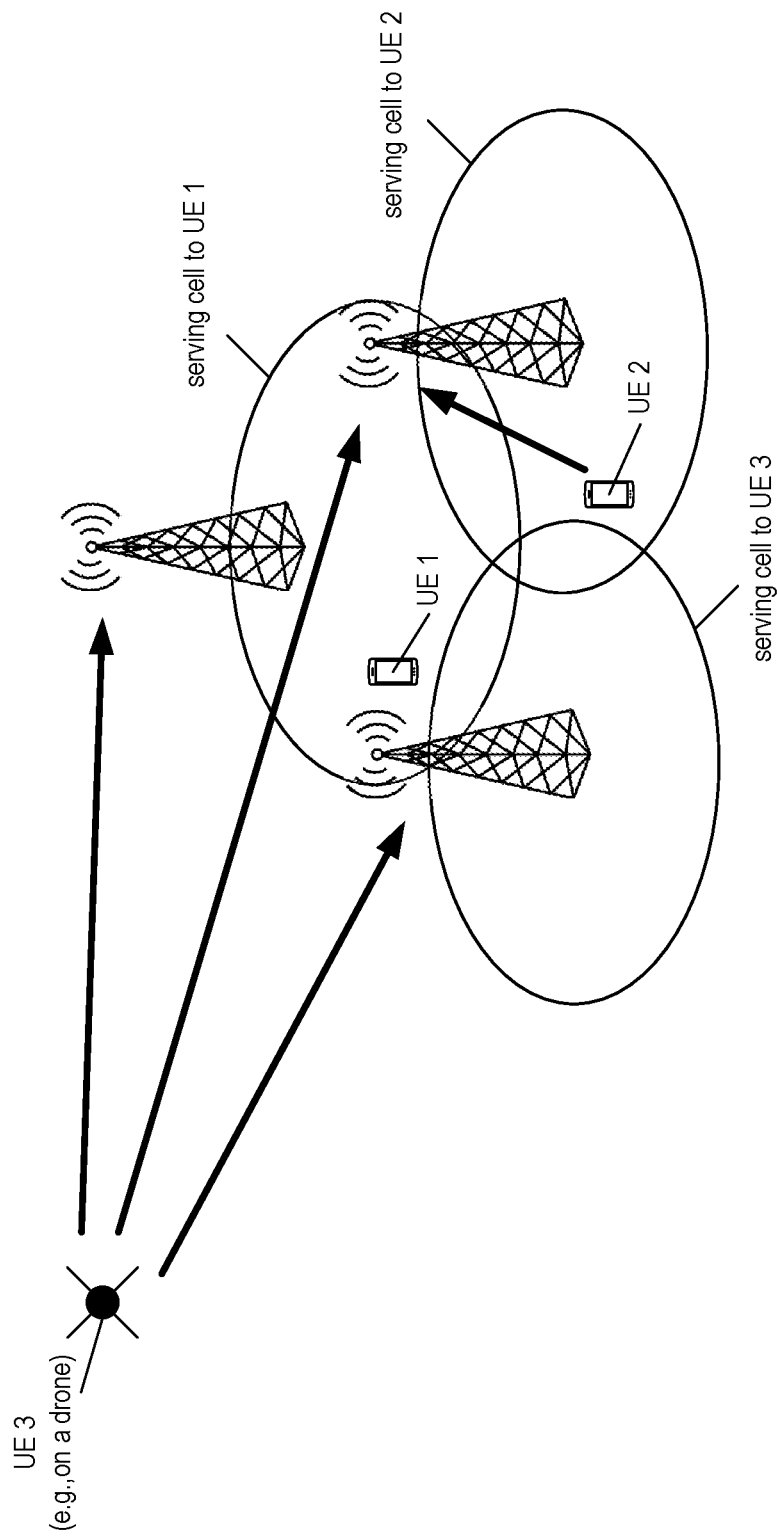
FIG. 6 illustrates how User Equipment devices (UEs) attached to drones or other aerial vehicles flying in the sky can cause uplink interference in neighbor cells due to high probability of Line of Sight (LOS) condition to neighbor cells.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Existing solutions for controlling or mitigating inference caused by aerial User Equipment devices (UEs) (e.g., drone UEs) firstly need to distinguish between a UE attached to a drone (or a drone UE) and a regular terrestrial UE. Secondly, if a UE attached to a drone (or a drone UE) is identified, the existing solutions apply the proposed power correction solutions regardless of whether the aerial UE is actually flying or is on the ground. If the aerial UE is on the ground, it is very similar to a regular UE and does not cause severe uplink interference. Hence, by reducing the transmit power of a drone UE when it is on the ground would degrade its uplink performance.

In addition, the fractional power control factor $\alpha$ and the pathloss (PL) are related to open loop power control. They are used to control the initial UE transmit power. When closed-loop power control is enabled, transmit power of a UE will be adjusted by the base station (i.e., the enhanced or evolved Node B (eNB) in Long Term Evolution (LTE) terminology) based on the target received power setting (i.e., $P_{O\_PUSCH,c}$) and the actual received signal power. Eventually after convergence the UE's transmit power will be determined by the target received power setting and the actual serving cell pathloss. Thus, changing the open-loop parameters can be effective only during the initial uplink data transmission. Also, since $\alpha$ is a higher layer configured parameter, it is not possible to frequently update the value of $\alpha$ once the drone UE moves from one physical location to another at high speeds (for instance, at 160 kilometers per hour (km/h)).

For the proposal of using a UE specific $P_{CMAX,c}(i')$ for drone UEs, it does not fully solve the uplink interference problem because a UE with low $P_{CMAX,c}(i')$ can still cause interference if a small number of resource blocks or bandwidth is scheduled.

Embodiments of the present disclosure address at least some of the problems associated with the existing solutions discussed above. In some embodiments of a first solution proposed herein, a network node (e.g., eNB) adjusts the target receive power of a wireless device (e.g., UE) based on the serving cell Reference Signal Received Power (RSRP) (or pathloss) as well as neighbor cell RSRP(s) (or pathloss(es)) or a difference between the serving cell RSRP and the neighbor cell RSRP(s) reported by the wireless device. If one or more of the neighbor cell RSRPs (or pathlosses) is very close to the serving cell RSRP (or pathloss), the target receive power from the wireless device is reduced so that a lower power is transmitted by the wireless device, which also reduces the interference to wireless devices in the neighbor cells. The amount of power reduction can be a function of the difference between the serving cell RSRP and the neighbor cell RSRPs. In some embodiments, the reduction can be implemented through closed loop power control.

In some embodiments of a second solution proposed herein, wireless device height dependent power control parameters are used for uplink power control. This can be implemented with open loop and/or closed loop power control.

Some example non-limiting benefits embodiments disclosed herein include the following. First, embodiments of the proposed solutions do not need to distinguish between a wireless device attached to a drone (or drone UE) and a terrestrial wireless device. Second, in some embodiments, if a wireless device attached to a drone (or drone UE) is on the ground, it would be treated as a regular terrestrial wireless device. Also, if a terrestrial wireless device causes high uplink interference to neighbor cells, the solution can also be used to reduce the interference.

Figure 7:
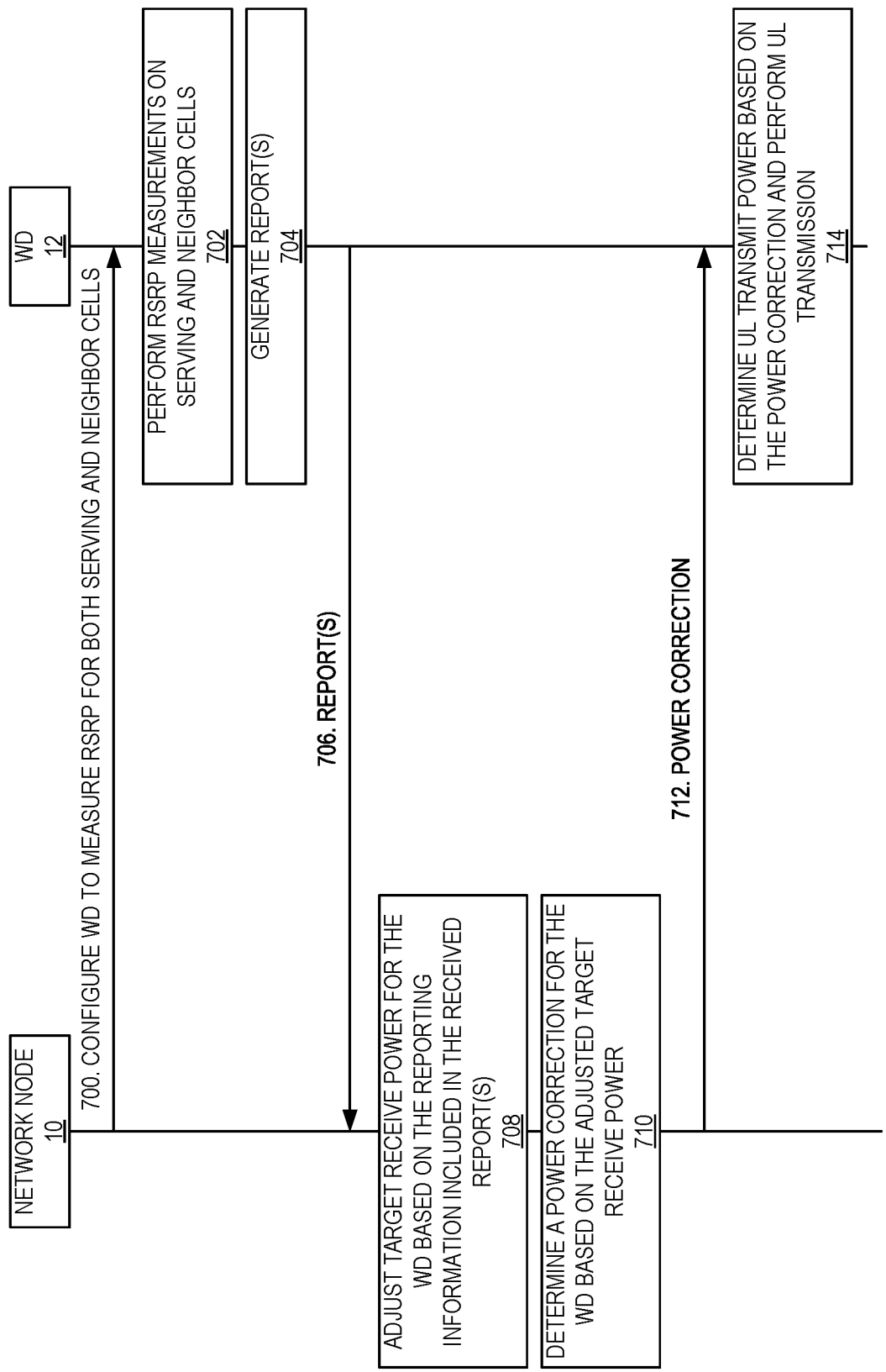
FIG. 7 illustrates the operation of a network node (e.g., a radio access node, e.g., a serving base station such as a serving enhanced or evolved Node B (eNB)) and a wireless device (e.g., a UE such as, e.g., a drone UE) in accordance with some embodiments of the present disclosure.

In this regard, FIG. 7 illustrates the operation of a network node 10 (e.g., a radio access node, e.g., a serving base station such as a serving eNB) and a wireless device 12 (e.g., a UE such as, e.g., a drone UE) in accordance with some embodiments of the present disclosure. As illustrated, the network node 10 configures the wireless device 12 to measure RSRP for both serving and neighbor cells (step 700). Note that while RSRP is used in the example embodiments disclosed herein, other types of measurements indicative of the pathloss between the wireless device 12 and the serving and neighboring cells may be used.

More specifically, the network node 10 configures the wireless device 12 to measure both serving cell and neighbor cell RSRPs. In some embodiments, the wireless device 12 is configured to report both the serving cell RSRP and the neighbor cell RSRP(s) if a defined (e.g., configured) reporting criterion is satisfied. In some particular embodiments, the reporting criterion is that the difference between the serving cell RSRP and the neighbor cell RSRP is within a pre-determined threshold, $\Delta RSRP_{th}$. Thus, if the difference between the serving cell RSRP and the neighbor cell RSRP is within a pre-determined threshold, $\Delta RSRP_{th}$, the wireless device 12 is to report both the serving cell and the neighbor cell RSRPs. For example, if $\Delta RSRP_{th}=3$ Decibels (dB) and the serving cell RSRP $RSRP_{sev}=-80$ dBm and a neighbor cell RSRP $RSRP_{neb}=-82$ dBm, the difference is then 2 dB which is less than $\Delta RSRP_{th}$. In this case, the wireless device 12 is to report both $RSRP_{sev}$ and $RSRP_{neb}$. In the case where two or more neighbor cell RSRPs meet the reporting criterion, either all the RSRPs satisfying the criterion are reported or only the strongest neighbor RSRP (i.e., the neighbor cell with the highest neighbor cell RSRP) is reported. The former would provide the network node 10 with additional information about how many cells may be impacted by the wireless device 12.

In some other embodiments, the wireless device 12 is configured to report the difference between the serving cell RSRP and the neighbor cell RSRP(s). In some embodiments, the wireless device 12 is configured to report the difference between the serving cell RSRP and the neighbor cell RSRP if a defined (e.g., configured) reporting criterion is satisfied. In some particular embodiments, the reporting criterion is that the difference between the serving cell RSRP and the neighbor cell RSRP is within a pre-determined threshold, $\Delta RSRP_{th}$. Thus, if the difference between the serving cell RSRP and the neighbor cell RSRP is within a pre-determined threshold, $\Delta RSRP_{th}$, the wireless device 12 is to report the difference between the serving cell RSRP and the neighbor cell RSRP. For example, if $\Delta RSRP_{th}=3$ dB and the serving cell RSRP $RSRP_{sev}=-80$ dBm and a neighbor cell RSRP $RSRP_{neb}=-82$ dBm, the difference is then 2 dB which is less than $\Delta RSRP_{th}$. In this case, the wireless device 12 is to report the difference between the serving cell RSRP and the neighbor cell RSRP. In the case where two or more neighbor cell RSRPs meet the reporting criterion, either RSRP differences for all of the neighbor cells for which the reporting criterion is satisfied are reported to the network node 10 or, alternatively, only the RSRP difference for the strongest neighbor RSRP (i.e., the neighbor cell with the highest neighbor cell RSRP) is reported, i.e., the reported RSRP difference $\Delta RSRP=$maximum $\{RSRP_{neib}(i)-RSRP_{sev}, i=1, \ldots, K\}$, where K is the number of neighbor cells.

In some other embodiments, the wireless device 12 is configured to measure both the serving cell and neighbor cell RSRPs and report these to the network node 10 (e.g., the serving eNB) periodically. After receiving the RSRP reports, the network node 10 computes the maximum RSRP difference $\Delta RSRP=$maximum $\{RSRP_{neib}(i)-RSRP_{sev}, i=1, \ldots, K\}$ where K is the number of neighbor cells or the RSRP difference $\Delta RSRP=RSRP_{neib}-RSRP_{sev}$ for each neighbor cell.

Once configured, the wireless device 12 performs RSRP measurements on both the serving cell of the wireless device 12 and one or more neighbor cells of the wireless device 12 (step 702). The wireless device 12 generates a report(s) (step 704) and sends the report(s) to the network node 10 (step 706). The report(s) include reporting information that includes:

- a serving cell RSRP measurement and a neighbor cell RSRP measurement(s) for neighbor cells for which a reporting criterion is satisfied (e.g., neighbor cells for which $\Delta RSRP=RSRP_{neib}-RSRP_{sev}$ is less than $\Delta RSRP_{th}$), or
- a RSRP difference $\Delta RSRP=RSRP_{neib}-RSRP_{sev}$ for one or more neighbor cells for which $\Delta RSRP=RSRP_{neib}-RSRP_{sev}$ is less than $\Delta RSRP_{th}$), or
- multiple (e.g., periodic) serving cell and neighbor cell RSRP measurements.

The network node 10 adjusts a target receive power for the wireless device 12 based on the reporting information (step 708). More specifically, the network node 10 adjusts (i.e., reduces) the target received power from the wireless device 12 by certain amount $\Delta P_o$. If the original target received power is $P_o$, the new target received power is then $P_{o,new}=P_o-\Delta P_o$, which is then used to derive the amount of power correction during closed loop power control for the wireless device 12.

In some embodiments, $\Delta P_o$, is a function of $\Delta RSRP$. For example, a simple relationship shown below can be used. The actual values may be tuned based on deployment scenarios.

TABLE 1

An example of target receive power adjustment based on RSRP differences

| $\Delta RSRP$ (dB) | $\Delta P_o$ (dB) |
|---|---|
| 1 | 5 |
| 0 | 4 |
| −1 | 3 |
| −2 | 2 |
| −3 | 1 |

In some other embodiments, the network node 10 has knowledge of the downlink reference signal transmit powers in neighbor cells, and the network node 10 computes the downlink pathloss in the serving cell and pathlosses between the neighbor cells and the wireless device 12 based on the reported RSRPs, i.e.

$$PL_c=P_{sev}-RSRP_{sev}$$

$$PL_{neib}(i)=P_{neib}(i)-RSRP_{neib}(i)$$

where $PL_c$, $P_{sev}$, and $RSRP_{sev}$ are respectively the pathloss, reference signal power, and the reported RSRP associated with the serving cell; and $PL_{neib}(i)$, $P_{neib}(i)$ and $RSRP_{neib}(i)$ are respectively the pathloss, reference signal transmit power, and reported RSRP associated to the ith neighbor cell. Instead of using ΔRSRP, $\Delta P_o$ can be derived based on the pathloss difference between the serving cell and the neighbor cell. For example, the network node 10 may calculate the pathloss difference as follows:

$$\Delta PL = \text{maximum}\{PL_{neib}(i) - PL_{sev}, i=1, \ldots, K\},$$

where K is the number of neighbor cells. By doing so, the difference of reference signal transmit power in neighbor cells can be taken into account and more accurate interference control can be achieved.

In another embodiment, the target received power reduction term $\Delta P_o$ is computed as a function of the strongest neighbor cell RSRP report (i.e., maximum $\{RSRP_{neib}(i), i=1, \ldots, K\}$) or the strongest neighbor cell path loss (i.e., maximum $\{PL_{neib}(i), i=1, \ldots, K\}$). In these embodiments, $\Delta P_o = \alpha_{neib} \times \text{maximum}\{RSRP_{neib}(i), i=1, \ldots, K\}$ or $\Delta P_o = \alpha_{neib} \times \text{maximum}\{PL_{neib}(i), i=1, \ldots, K\}$, where $\alpha_{neib}$ is a scaling factor associated with the strongest neighbor cell that is used to compute the received power reduction term $\Delta P_o$.

In another embodiment, $\Delta P_o$ is computed as a linear sum of up to $K_{max}$ neighbor cell RSRP reports (i.e., $\{RSRP_{neib}(i), i=1, \ldots, K_{max}\}$) or as a linear sum of up to $K_{max}$ neighbor cell path losses (i.e., $\{PL_{neib}(i), i=1, \ldots, K_{max}\}$), where $K_{max}$ is smaller than the total number of neighbor cells K. That is, $\Delta P_o = \sum_{i=1}^{K_{max}} \alpha_{neib,i} \times RSRP_{neib}(i)$ or $\Delta P_o = \sum_{i=1}^{K_{max}} \alpha_{neib,i} \times PL_{neib}(i)$ where $\alpha_{neib,i}$ is a scaling factor associated with the ith neighbor cell.

The network node 10 then determines a power correction value for the wireless device 12 based on the adjusted target receive power $P_{o,new} = P_o - \Delta P_o$ and an actual received signal power $P_{rx}(t)$ from the wireless device 12 (step 710). More specifically, the network node 10 calculates a new power correction $\Delta P$ by comparing the actual received signal power, $P_{rx}(t)$, from the wireless device 12 and the new target received power, $P_{o,new}$, i.e. $\Delta P = -(P_{rx}(t) - P_{o,new})$. The network node 10 then provides (e.g., through control signaling on Physical Downlink Control Channel (PDCCH)) the new power correction to the wireless device 12 to thereby instruct the wireless device 12 to adjust its transmit power by ΔP (dB) or a quantized version of it until the new target received power is reached (step 712). In some embodiments, the signaling from the network node 10 (e.g., serving eNB) to the wireless device 12 to adjust its transmit power by ΔP is via the Physical Uplink Shared Channel (PUSCH) power control adjustment state $f_c(i)$ with accumulation enabled. In this case, multiple transmit power control commands may be sent to the wireless device 12 over time until the new target received power is reached.

The wireless device 12 determines its uplink transmit power based on the power correction received from the network node 10 and performs an uplink transmission in accordance with the determined uplink transmit power (step 714).

Figure 8:
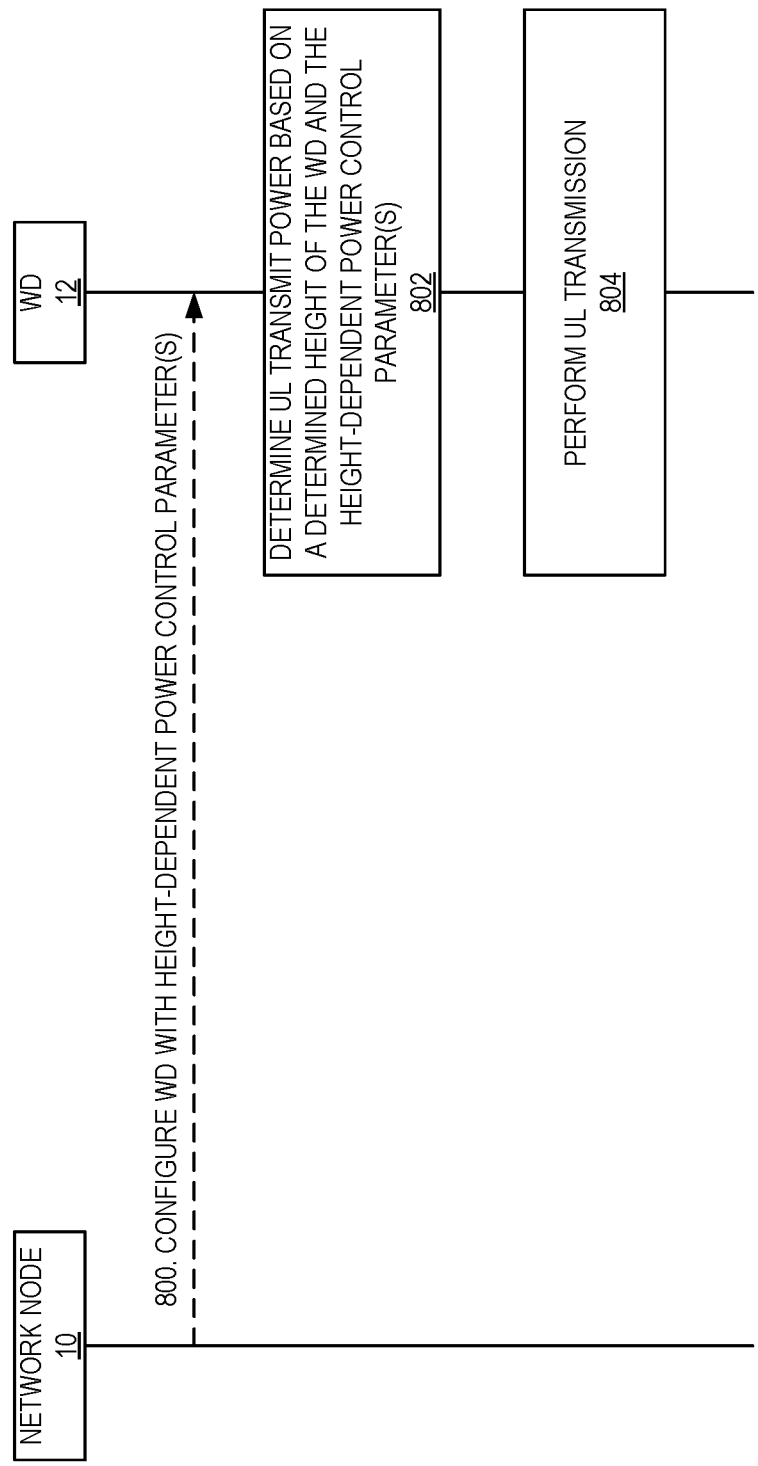
FIG. 8 illustrates the operation of the network node and the wireless device to operate in accordance with some embodiments of the present disclosure.

FIG. 8 illustrates the operation of the network node 10 and the wireless device 12 to operate in accordance with a second solution. Optional steps are indicated by dashed lines. Optionally, the network node 10 configures the wireless device 12 with one or more height dependent power control parameters (step 800). Alternatively, the one or more height dependent power control parameters are stored locally at the wireless device 12 and obtained, by the wireless device 12, from, e.g., memory. The wireless device 12 determines an uplink transmit power for the wireless device 12 based on a determined height of the wireless device 12 and the one or more height dependent power control parameters (step 802). The wireless device 12 then performs an uplink transmission in accordance with the determined uplink transmit power (step 804).

Figure 9:
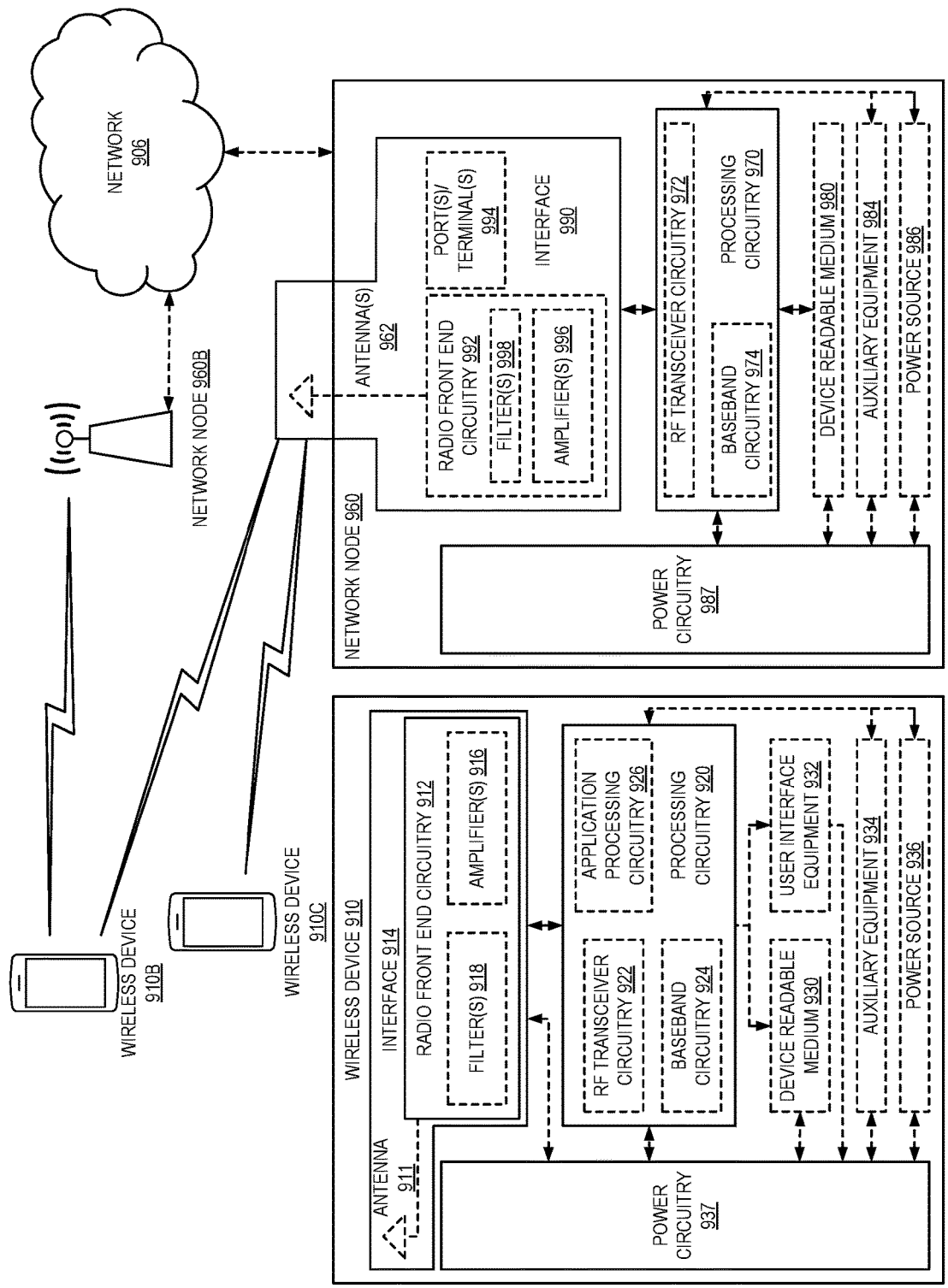
FIG. 9 illustrates an example wireless network according to some embodiments of the present disclosure.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts a network 906, network nodes 960 and 960B, and Wireless Devices (WDs) 910, 910B, and 910C. Note that the network node 10 of FIGS. 7 and 8 corresponds to one of the network nodes 960, and the wireless device 12 of FIGS. 7 and 8 corresponds to one of the WDs 910. In practice, a wireless network may further include any additional elements suitable to support communication between wireless devices or between a wireless device and another communication device, such as a landline telephone, a service provider, or any other network node or end device. Of the illustrated components, the network node 960 and the WD 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second Generation (2G), Third Generation (3G), Fourth Generation (4G), or Fifth Generation (5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 906 may comprise one or more backhaul networks, core networks, Internet Protocol (IP) networks, Public Switched Telephone Networks (PSTNs), packet data networks, optical networks, Wide-Area Networks (WANs), Local Area Networks (LANs), WLANs, wired networks, wireless networks, metropolitan area networks, and other networks to enable communication between devices.

The network node 960 and the WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (e.g., radio access points), base stations (e.g., radio base stations, Node Bs, eNBs, and New Radio (NR) Base Station (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such remote radio units may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multi-cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization and Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, the network node 960 includes processing circuitry 970, a device readable medium 980, an interface 990, auxiliary equipment 984, a power source 986, power circuitry 987, and an antenna 962. Although the network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 960 are depicted as single boxes located within a larger box, or nested within multiple boxes, in practice, a network node may comprise multiple different physical components that make up a single illustrated component (e.g., the device readable medium 980 may comprise multiple separate hard drives as well as multiple Random Access Memory (RAM) modules).

Similarly, the network node 960 may be composed of multiple physically separate components (e.g., a Node B component and a RNC component, or a BTS component and a BSC component, etc.), which may each have their own respective components. In certain scenarios in which the network node 960 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 960 may be configured to support multiple Radio Access Technologies (RATs). In such embodiments, some components may be duplicated (e.g., a separate device readable medium 980 for the different RATs) and some components may be reused (e.g., the same antenna 962 may be shared by the RATs). The network node 960 may also include multiple sets of the various illustrated components for different wireless technologies integrated into the network node 960, such as, for example, GSM, Wideband Code Division Multiple Access (WCDMA), LTE, NR, WiFi, or Bluetooth wireless technologies. These wireless technologies may be integrated into the same or different chip or set of chips and other components within the network node 960.

The processing circuitry 970 is configured to perform any determining, calculating, or similar operations (e.g., certain obtaining operations) described herein as being provided by a network node. These operations performed by the processing circuitry 970 may include processing information obtained by the processing circuitry 970 by, for example, converting the obtained information into other information, comparing the obtained information or converted information to information stored in the network node 960, and/or performing one or more operations based on the obtained information or converted information, and as a result of said processing making a determination.

The processing circuitry 970 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 960 components, such as the device readable medium 980, network node 960 functionality. For example, the processing circuitry 970 may execute instructions stored in the device readable medium 980 or in memory within the processing circuitry 970. Such functionality may include providing any of the various wireless features, functions, or benefits discussed herein. In some embodiments, the processing circuitry 970 may include a System on a Chip (SOC).

In some embodiments, the processing circuitry 970 may include one or more of Radio Frequency (RF) transceiver circuitry 972 and baseband processing circuitry 974. In some embodiments, the RF transceiver circuitry 972 and the baseband processing circuitry 974 may be on separate chips (or sets of chips), boards, or units, such as radio units and digital units. In alternative embodiments, part or all of the RF transceiver circuitry 972 and the baseband processing circuitry 974 may be on the same chip or set of chips, boards, or units.

In certain embodiments, some or all of the functionality described herein as being provided by a network node, base station, eNB, or other such network device may be performed by the processing circuitry 970 executing instructions stored on the device readable medium 980 or memory within the processing circuitry 970. In alternative embodiments, some or all of the functionality may be provided by the processing circuitry 970 without executing instructions stored on a separate or discrete device readable medium, such as in a hard-wired manner. In any of those embodiments, whether executing instructions stored on a device readable storage medium or not, the processing circuitry 970 can be configured to perform the described functionality. The benefits provided by such functionality are not limited to the processing circuitry 970 alone or to other components of the network node 960, but are enjoyed by the network node 960 as a whole, and/or by end users and the wireless network generally.

The device readable medium 980 may comprise any form of volatile or non-volatile computer readable memory including, without limitation, persistent storage, solid-state memory, remotely mounted memory, magnetic media, optical media, RAM, Read-Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 970. The device readable medium 980 may store any suitable instructions, data or information, including a computer program, software, an application including one or more of logic, rules, code, tables, etc., and/or other instructions capable of being executed by the processing circuitry 970 and utilized by the network node 960. The device readable medium 980 may be used to store any calculations made by the processing circuitry 970 and/or any data received via the interface 990. In some embodiments, the processing circuitry 970 and the device readable medium 980 may be considered to be integrated.

The interface 990 is used in the wired or wireless communication of signaling and/or data between the network node 960, the network 906, and/or WDs 910. As illustrated, the interface 990 comprises port(s)/terminal(s) 994 to send and receive data, for example to and from the network 906 over a wired connection. The interface 990 also includes radio front end circuitry 992 that may be coupled to, or in certain embodiments a part of, the antenna 962. The radio front end circuitry 992 comprises filters 998 and amplifiers 996. The radio front end circuitry 992 may be connected to the antenna 962 and the processing circuitry 970. The radio front end circuitry 992 may be configured to condition signals communicated between the antenna 962 and the processing circuitry 970. The radio front end circuitry 992 may receive digital data that is to be sent out to other network nodes or WDs via a wireless connection. The radio front end circuitry 992 may convert the digital data into a radio signal having the appropriate channel and bandwidth parameters using a combination of filters 998 and/or amplifiers 996. The radio signal may then be transmitted via the antenna 962. Similarly, when receiving data, the antenna 962 may collect radio signals which are then converted into digital data by the radio front end circuitry 992. The digital data may be passed to the processing circuitry 970. In other embodiments, the interface 990 may comprise different components and/or different combinations of components.

In certain alternative embodiments, the network node 960 may not include separate radio front end circuitry 992; instead, the processing circuitry 970 may comprise radio front end circuitry and may be connected to the antenna 962 without separate radio front end circuitry 992. Similarly, in some embodiments, all or some of the RF transceiver circuitry 972 may be considered a part of the interface 990. In still other embodiments, the interface 990 may include one or more ports or terminals 994, the radio front end circuitry 992, and the RF transceiver circuitry 972, as part of a radio unit (not shown), and the interface 990 may communicate with the baseband processing circuitry 974, which is part of a digital unit (not shown).

The antenna 962 may include one or more antennas, or antenna arrays, configured to send and/or receive wireless signals. The antenna 962 may be coupled to the radio front end circuitry 992 and may be any type of antenna capable of transmitting and receiving data and/or signals wirelessly. In some embodiments, the antenna 962 may comprise one or more omni-directional, sector, or panel antennas operable to transmit/receive radio signals between, for example, 2 Gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 962 may be separate from the network node 960 and may be connectable to the network node 960 through an interface or port.

The antenna 962, the interface 990, and/or the processing circuitry 970 may be configured to perform any receiving operations and/or certain obtaining operations described herein as being performed by a network node. Any information, data, and/or signals may be received from a wireless device, another network node, and/or any other network equipment. Similarly, the antenna 962, the interface 990, and/or the processing circuitry 970 may be configured to perform any transmitting operations described herein as being performed by a network node. Any information, data, and/or signals may be transmitted to a wireless device, another network node, and/or any other network equipment. The power circuitry 987 may comprise, or be coupled to, power management circuitry and is configured to supply the components of the network node 960 with power for performing the functionality described herein. The power circuitry 987 may receive power from a power source 986. The power source 986 and/or the power circuitry 987 may be configured to provide power to the various components of the network node 960 in a form suitable for the respective components (e.g., at a voltage and current level needed for each respective component). The power source 986 may either be included in, or external to, the power circuitry 987 and/or the network node 960. For example, the network node 960 may be connectable to an external power source (e.g., an electricity outlet) via an input circuitry or interface such as an electrical cable, whereby the external power source supplies power to the power circuitry 987. As a further example, the power source 986 may comprise a source of power in the form of a battery or battery pack which is connected to, or integrated in, the power circuitry 987. The battery may provide backup power should the external power source fail. Other types of power sources, such as photovoltaic devices, may also be used.

Alternative embodiments of the network node 960 may include additional components beyond those shown in FIG. 9 that may be responsible for providing certain aspects of the network node's functionality, including any of the functionality described herein and/or any functionality necessary to support the subject matter described herein. For example, the network node 960 may include user interface equipment to allow input of information into the network node 960 and to allow output of information from the network node 960. This may allow a user to perform diagnostic, maintenance, repair, and other administrative functions for the network node 960.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice Over Internet Protocol (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, wireless Customer Premise Equipment (CPE), a vehicle-mounted wireless terminal device, etc. A WD may support Device-to-Device (D2D) communication, for example by implementing a Third Generation Partnership Project (3GPP) standard for sidelink communication, Vehicle-to-Vehicle (V2V), Vehicle-to-Infrastructure (V2I), Vehicle-to-Everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, a WD 910 includes an antenna 911, an interface 914, processing circuitry 920, a device readable medium 930, user interface equipment 932, auxiliary equipment 934, a power source 936, and power circuitry 937. The WD 910 may include multiple sets of one or more of the illustrated components for different wireless technologies supported by the WD 910, such as, for example, GSM, WCDMA, LTE, NR, WiFi, WiMAX, or Bluetooth wireless technologies, just to mention a few. These wireless technologies may be integrated into the same or different chips or set of chips as other components within the WD 910.

The antenna 911 may include one or more antennas or antenna arrays configured to send and/or receive wireless signals, and is connected to the interface 914. In certain alternative embodiments, the antenna 911 may be separate from the WD 910 and be connectable to the WD 910 through an interface or port. The antenna 911, the interface 914, and/or the processing circuitry 920 may be configured to perform any receiving or transmitting operations described herein as being performed by a WD. Any information, data, and/or signals may be received from a network node and/or another WD. In some embodiments, radio front end circuitry and/or the antenna 911 may be considered an interface.

As illustrated, the interface 914 comprises radio front end circuitry 912 and the antenna 911. The radio front end circuitry 912 comprise one or more filters 918 and amplifiers 916. The radio front end circuitry 912 is connected to the antenna 911 and the processing circuitry 920, and is configured to condition signals communicated between the antenna 911 and the processing circuitry 920. The radio front end circuitry 912 may be coupled to or a part of the antenna 911. In some embodiments, the WD 910 may not include separate radio front end circuitry 912; rather, the processing circuitry 920 may comprise radio front end circuitry and may be connected to the antenna 911. Similarly, in some embodiments, some or all of the RF transceiver circuitry 922 may be considered a part of the interface 914. The radio front end circuitry 912 may receive digital data that is to be sent out to other network nodes or WDs via a wireless connection. The radio front end circuitry 912 may convert the digital data into a radio signal having the appropriate channel and bandwidth parameters using a combination of the filters 918 and/or the amplifiers 916. The radio signal may then be transmitted via the antenna 911. Similarly, when receiving data, the antenna 911 may collect radio signals which are then converted into digital data by the radio front end circuitry 912. The digital data may be passed to the processing circuitry 920. In other embodiments, the interface 914 may comprise different components and/or different combinations of components.

The processing circuitry 920 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 910 components, such as the device readable medium 930, WD 910 functionality. Such functionality may include providing any of the various wireless features or benefits discussed herein. For example, the processing circuitry 920 may execute instructions stored in the device readable medium 930 or in memory within the processing circuitry 920 to provide the functionality disclosed herein.

As illustrated, the processing circuitry 920 includes one or more of RF transceiver circuitry 922, baseband processing circuitry 924, and application processing circuitry 926. In other embodiments, the processing circuitry 920 may comprise different components and/or different combinations of components. In certain embodiments the processing circuitry 920 of the WD 910 may comprise a SOC. In some embodiments, the RF transceiver circuitry 922, the baseband processing circuitry 924, and the application processing circuitry 926 may be on separate chips or sets of chips. In alternative embodiments, part or all of the baseband processing circuitry 924 and the application processing circuitry 926 may be combined into one chip or set of chips, and the RF transceiver circuitry 922 may be on a separate chip or set of chips. In still alternative embodiments, part or all of the RF transceiver circuitry 922 and the baseband processing circuitry 924 may be on the same chip or set of chips, and the application processing circuitry 926 may be on a separate chip or set of chips. In yet other alternative embodiments, part or all of the RF transceiver circuitry 922, the baseband processing circuitry 924, and the application processing circuitry 926 may be combined in the same chip or set of chips. In some embodiments, the RF transceiver circuitry 922 may be a part of the interface 914. The RF transceiver circuitry 922 may condition RF signals for the processing circuitry 920.

In certain embodiments, some or all of the functionality described herein as being performed by a WD may be provided by the processing circuitry 920 executing instructions stored on the device readable medium 930, which in certain embodiments may be a computer-readable storage medium. In alternative embodiments, some or all of the functionality may be provided by the processing circuitry 920 without executing instructions stored on a separate or discrete device readable storage medium, such as in a hard-wired manner. In any of those particular embodiments, whether executing instructions stored on a device readable storage medium or not, the processing circuitry 920 can be configured to perform the described functionality. The benefits provided by such functionality are not limited to the processing circuitry 920 alone or to other components of the WD 910, but are enjoyed by the WD 910 as a whole, and/or by end users and the wireless network generally.

The processing circuitry 920 may be configured to perform any determining, calculating, or similar operations (e.g., certain obtaining operations) described herein as being performed by a WD. These operations, as performed by the processing circuitry 920, may include processing information obtained by the processing circuitry 920 by, for example, converting the obtained information into other information, comparing the obtained information or converted information to information stored by the WD 910, and/or performing one or more operations based on the obtained information or converted information, and as a result of said processing making a determination.

The device readable medium 930 may be operable to store a computer program, software, an application including one or more of logic, rules, code, tables, etc., and/or other instructions capable of being executed by the processing circuitry 920. The device readable medium 930 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 920. In some embodiments, the processing circuitry 920 and the device readable medium 930 may be considered to be integrated.

The user interface equipment 932 may provide components that allow for a human user to interact with the WD 910. Such interaction may be of many forms, such as visual, audial, tactile, etc. The user interface equipment 932 may be operable to produce output to the user and to allow the user to provide input to the WD 910. The type of interaction may vary depending on the type of user interface equipment 932 installed in the WD 910. For example, if the WD 910 is a smart phone, the interaction may be via a touch screen; if the WD 910 is a smart meter, the interaction may be through a screen that provides usage (e.g., the number of gallons used) or a speaker that provides an audible alert (e.g., if smoke is detected). The user interface equipment 932 may include input interfaces, devices, and circuits, and output interfaces, devices, and circuits. The user interface equipment 932 is configured to allow input of information into the WD 910, and is connected to the processing circuitry 920 to allow the processing circuitry 920 to process the input information. The user interface equipment 932 may include, for example, a microphone, a proximity or other sensor, keys/buttons, a touch display, one or more cameras, a Universal Serial Bus (USB) port, or other input circuitry. The user interface equipment 932 is also configured to allow output of information from the WD 910, and to allow the processing circuitry 920 to output information from the WD 910. The user interface equipment 932 may include, for example, a speaker, a display, vibrating circuitry, a USB port, a headphone interface, or other output circuitry. Using one or more input and output interfaces, devices, and circuits of the user interface equipment 932, the WD 910 may communicate with end users and/or the wireless network and allow them to benefit from the functionality described herein.

The auxiliary equipment 934 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 934 may vary depending on the embodiment and/or scenario.

The power source 936 may, in some embodiments, be in the form of a battery or battery pack. Other types of power sources, such as an external power source (e.g., an electricity outlet), photovoltaic devices, or power cells, may also be used. The WD 910 may further comprise power circuitry 937 for delivering power from the power source 936 to the various parts of the WD 910 which need power from the power source 936 to carry out any functionality described or indicated herein. The power circuitry 937 may in certain embodiments comprise power management circuitry. The power circuitry 937 may additionally or alternatively be operable to receive power from an external power source; in which case the WD 910 may be connectable to the external power source (such as an electricity outlet) via input circuitry or an interface such as an electrical power cable. The power circuitry 937 may also in certain embodiments be operable to deliver power from an external power source to the power source 936. This may be, for example, for the charging of the power source 936. The power circuitry 937 may perform any formatting, converting, or other modification to the power from the power source 936 to make the power suitable for the respective components of the WD 910 to which power is supplied.

Figure 10:
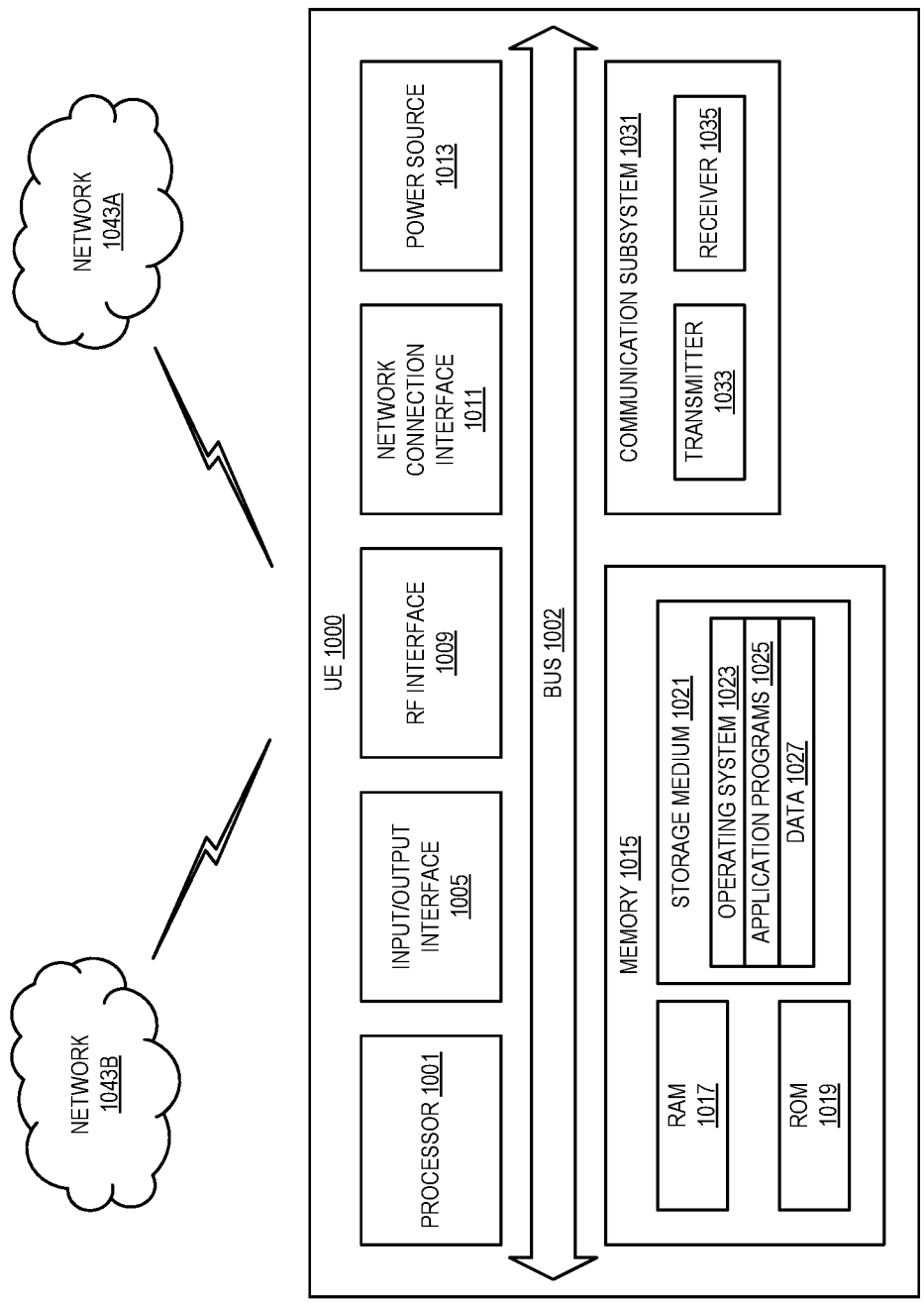
FIG. 10 illustrates one embodiment of a UE (or wireless device) in accordance with some embodiments of the present disclosure.

FIG. 10 illustrates one embodiment of a UE (or wireless device) in accordance with various aspects described herein. As used herein, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1000 may be any UE identified by the 3GPP, including a NB-IoT UE, a MTC UE, and/or an enhanced MTC (eMTC) UE. The UE 1000, as illustrated in FIG. 10, is one example of a WD configured for communication in accordance with one or more communication standards promulgated by the 3GPP, such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, the UE 1000 includes processing circuitry 1001 that is operatively coupled to an input/output interface 1005, a RF interface 1009, a network connection interface 1011, memory 1015 including RAM 1017, ROM 1019, and a storage medium 1021 or the like, a communication subsystem 1031, a power source 1013, and/or any other component, or any combination thereof. The storage medium 1021 includes an operating system 1023, an application program 1025, and data 1027. In other embodiments, the storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, the processing circuitry 1001 may be configured to process computer instructions and data. The processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 1001 may include two CPUs. Data may be information in a form suitable for use by a computer.

In the depicted embodiment, the input/output interface 1005 may be configured to provide a communication interface to an input device, output device, or input and output device. The UE 1000 may be configured to use an output device via the input/output interface 1005. An output device may use the same type of interface port as an input device. For example, a USB port may be used to provide input to and output from the UE 1000. The output device may be a speaker, a sound card, a video card, a display, a monitor, a printer, an actuator, an emitter, a smartcard, another output device, or any combination thereof. The UE 1000 may be configured to use an input device via the input/output interface 1005 to allow a user to capture information into the UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043A. The network 1043A may encompass wired and/or wireless networks such as a LAN, a WAN, a computer network, a wireless network, a telecommunications network, another like network or any combination thereof. For example, the network 1043A may comprise a Wi-Fi network. The network connection interface 1011 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1011 may implement receiver and transmitter functionality appropriate to the communication network links (e.g., optical, electrical, and the like). The transmitter and receiver functions may share circuit components, software or firmware, or alternatively may be implemented separately.

The RAM 1017 may be configured to interface via a bus 1002 to the processing circuitry 1001 to provide storage or caching of data or computer instructions during the execution of software programs such as the operating system, application programs, and device drivers. The ROM 1019 may be configured to provide computer instructions or data to the processing circuitry 1001. For example, the ROM 1019 may be configured to store invariant low-level system code or data for basic system functions such as basic Input/Output (I/O), startup, or reception of keystrokes from a keyboard that are stored in a non-volatile memory. The storage medium 1021 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1021 may be configured to include an operating system 1023, an application program 1025 such as a web browser application, a widget or gadget engine or another application, and a data file 1027. The storage medium 1021 may store, for use by the UE 1000, any of a variety of various operating systems or combinations of operating systems.

The storage medium 1021 may be configured to include a number of physical drive units, such as Redundant Array of Independent Disks (RAID), floppy disk drive, flash memory, USB flash drive, external hard disk drive, thumb drive, pen drive, key drive, High-Density DVD (HD-DVD) optical disc drive, internal hard disk drive, Blu-Ray optical disc drive, Holographic Digital Data Storage (HDDS) optical disc drive, external mini-Dual In-line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1021 may allow the UE 1000 to access computer-executable instructions, application programs, or the like stored on transitory or non-transitory memory media to off-load data or to upload data. An article of manufacture, such as one utilizing a communication system, may be tangibly embodied in the storage medium 1021, which may comprise a device readable medium.

In FIG. 10, the processing circuitry 1001 may be configured to communicate with the network 1043B using the communication subsystem 1031. The network 1043A and the network 1043B may be the same network or networks or different network or networks. The communication subsystem 1031 may be configured to include one or more transceivers used to communicate with the network 1043B. For example, the communication subsystem 1031 may be configured to include one or more transceivers used to communicate with one or more remote transceivers of another device capable of wireless communication such as another WD, UE, or base station of a Radio Access Network (RAN) according to one or more communication protocols, such as IEEE 802.10, Code Division Multiple Access (CDMA), WCDMA, GSM, LTE, Universal Terrestrial Radio Access Network (UTRAN), WiMax, or the like. Each transceiver may include a transmitter 1033 and/or a receiver 1035 to implement transmitter or receiver functionality, respectively, appropriate to the RAN links (e.g., frequency allocations and the like). Further, the transmitter 1033 and the receiver 1035 of each transceiver may share circuit components, software, or firmware, or alternatively may be implemented separately.

In the illustrated embodiment, the communication functions of the communication subsystem 1031 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1031 may include cellular communication, Wi-Fi communication, Bluetooth communication, and GPS communication. The network 1043B may encompass wired and/or wireless networks such as a LAN, a WAN, a computer network, a wireless network, a telecommunications network, another like network or any combination thereof. For example, the network 1043B may be a cellular network, a Wi-Fi network, and/or a near-field network. The power source 1013 may be configured to provide Alternating Current (AC) or Direct Current (DC) power to components of the UE 1000.

The features, benefits, and/or functions described herein may be implemented in one of the components of the UE 1000 or partitioned across multiple components of the UE 1000. Further, the features, benefits, and/or functions described herein may be implemented in any combination of hardware, software, or firmware. In one example, the communication subsystem 1031 may be configured to include any of the components described herein. Further, the processing circuitry 1001 may be configured to communicate with any of such components over the bus 1002. In another example, any of such components may be represented by program instructions stored in memory that when executed by the processing circuitry 1001 perform the corresponding functions described herein. In another example, the functionality of any of such components may be partitioned between the processing circuitry 1001 and the communication subsystem 1031. In another example, the non-computationally intensive functions of any of such components may be implemented in software or firmware and the computationally intensive functions may be implemented in hardware.

Figure 11:
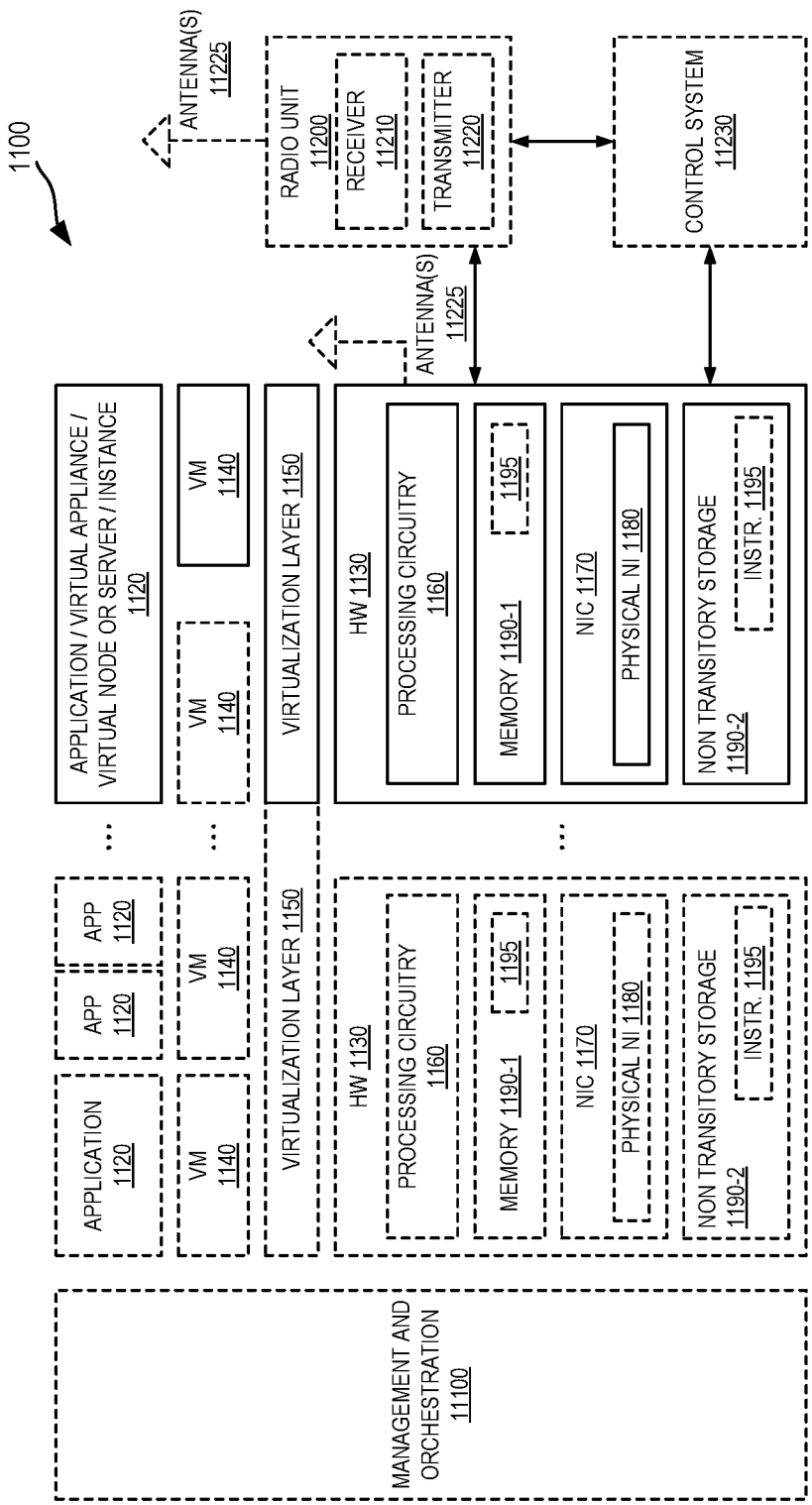
FIG. 11 illustrates a schematic block diagram illustrating a virtualization environment in which functions implemented by some embodiments of the present disclosure may be virtualized.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1100 hosted by one or more hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. The applications 1120 are run in the virtualization environment 1100 which provides the hardware node 1130 comprising processing circuitry 1160 and memory 1190. The memory 1190 contains instructions 1195 executable by the processing circuitry 1160 whereby the application 1120 is operative to provide one or more of the features, benefits, and/or functions disclosed herein. The virtualization environment 1100 comprises general-purpose or special-purpose hardware nodes 1130 comprising a set of one or more processors or processing circuitry 1160, which may be Commercial Off-The-Shelf (COTS) processors, dedicated ASICs, or any other type of processing circuitry including digital or analog hardware components or special purpose processors. Each hardware device may comprise memory 1190-1 which may be non-persistent memory for temporarily storing instructions 1195 or software executed by the processing circuitry 1160. Each hardware device may comprise one or more Network Interface Controllers (NICs) 1170, also known as network interface cards, which include a physical network interface 1180. Each hardware device may also include non-transitory, persistent, machine-readable storage media 1190-2 having stored therein software 1195 and/or instructions executable by the processing circuitry 1160. The software 1195 may include any type of software including software for instantiating one or more virtualization layers 1150 (also referred to as hypervisors), software to execute virtual machines 1140, as well as software allowing it to execute functions, features, and/or benefits described in relation with some embodiments described herein.

The virtual machines 1140 comprise virtual processing, virtual memory, virtual networking or interface, and virtual storage, and may be run by a corresponding virtualization layer 1150 or hypervisor. Different embodiments of the instance of the virtual appliance 1120 may be implemented on one or more of the virtual machines 1140, and the implementations may be made in different ways.

During operation, the processing circuitry 1160 executes the software 1195 to instantiate the hypervisor or virtualization layer 1150, which may sometimes be referred to as a Virtual Machine Monitor (VMM). The virtualization layer 1150 may present a virtual operating platform that appears like networking hardware to the virtual machine 1140.

As shown in FIG. 11, the hardware node 1130 may be a standalone network node with generic or specific components. The hardware node 1130 may comprise an antenna 11225 and may implement some functions via virtualization. Alternatively, the hardware node 1130 may be part of a larger cluster of hardware (e.g. such as in a data center or CPE) where many hardware nodes work together and are managed via Management and Orchestration (MANO) 11100, which, among others, oversees lifecycle management of the applications 1120.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, the virtual machine 1140 may be a software implementation of a physical machine that runs programs as if they were executing on a physical, non-virtualized machine. Each of the virtual machines 1140, and that part of the hardware node 1130 that executes that virtual machine, be it hardware dedicated to that virtual machine and/or hardware shared by that virtual machine with others of the virtual machines 1140, forms a separate Virtual Network Element (VNE).

Still in the context of NFV, Virtual Network Function (VNF) is responsible for handling specific network functions that run in one or more virtual machines 1140 on top of the hardware node 1130 and corresponds to the application 1120 in FIG. 11.

In some embodiments, one or more radio units 11200 that each include one or more transmitters 11220 and one or more receivers 11210 may be coupled to the one or more antennas 11225. The radio units 11200 may communicate directly with the hardware nodes 1130 via one or more appropriate network interfaces and may be used in combination with the virtual components to provide a virtual node with radio capabilities, such as a radio access node or a base station.

In some embodiments, some signaling can be effected with the use of the control system 11230 which may alternatively be used for communication between the hardware nodes 1130 and the radio units 11200.

Figure 12:
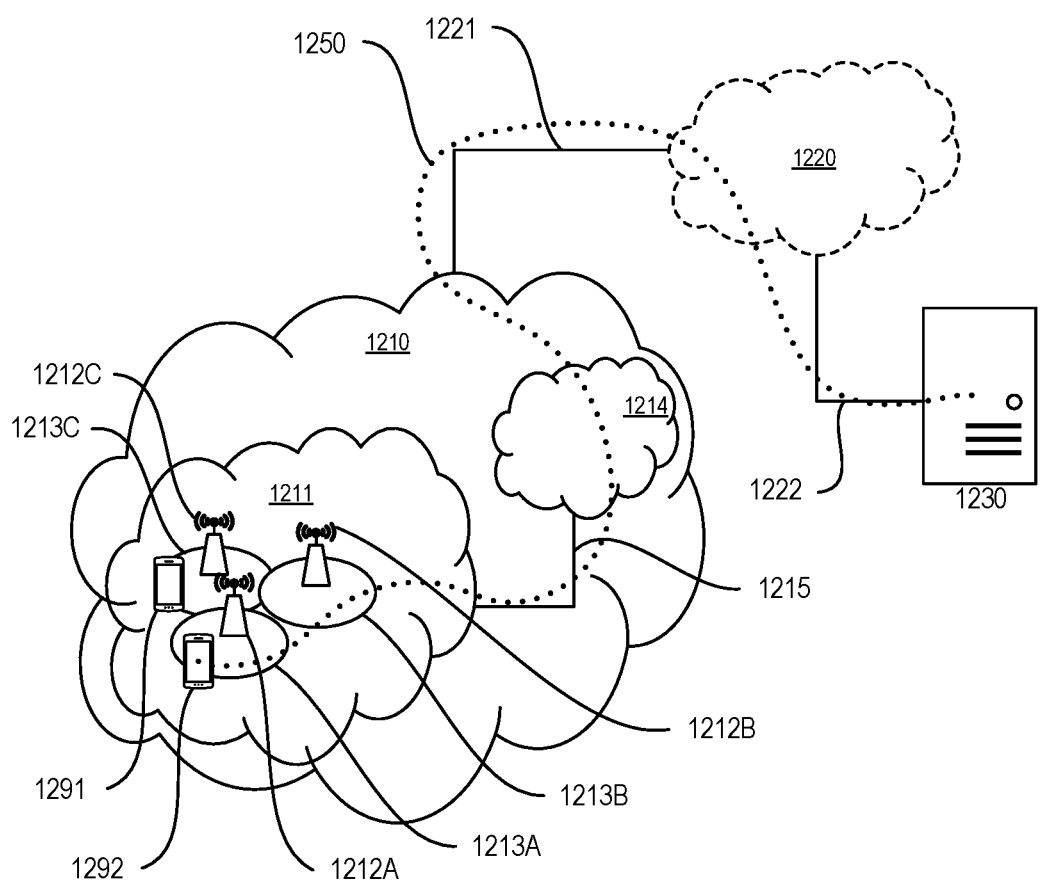
FIG. 12 illustrates a communication system according to some embodiments of the present disclosure.

With reference to FIG. 12, in accordance with an embodiment, a communication system includes a telecommunication network 1210, such as a 3GPP-type cellular network, which comprises an access network 1211, such as a RAN, and a core network 1214. The access network 1211 comprises a plurality of base stations 1212A, 1212B, 1212C, such as Node Bs, eNBs, gNBs, or other types of wireless access points, each defining a corresponding coverage area 1213A, 1213B, 1213C. Each base station 1212A, 1212B, 1212C is connectable to the core network 1214 over a wired or wireless connection 1215. A first UE 1291 located in coverage area 1213C is configured to wirelessly connect to, or be paged by, the corresponding base station 1212C. A second UE 1292 in coverage area 1213A is wirelessly connectable to the corresponding base station 1212A. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server, or as processing resources in a server farm. The host computer 1230 may be under the ownership or control of a service provider or may be operated by the service provider or on behalf of the service provider. Connections 1221 and 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private, or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an Over-The-Top (OTT) connection 1250. The host computer 1230 and the connected UEs 1291, 1292 are configured to communicate data and/or signaling via the OTT connection 1250, using the access network 1211, the core network 1214, any intermediate network 1220, and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station, and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, ASICs, FPGAs, or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, ASICs, FPGAs, or combinations of these (not shown) adapted to execute instructions. The base station 1320 further has software 1321 stored internally or accessible via an external connection.

The communication system 1300 further includes the UE 1330 already referred to. The UE 1330 includes hardware 1335 which may include a radio interface 1337 configured to set up and maintain the wireless connection 1370 with the base station 1320 serving a coverage area in which the UE 1330 is currently located. The hardware 1335 of the UE 1330 further includes processing circuitry 1338, which may comprise one or more programmable processors, ASICs, FPGAs, or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
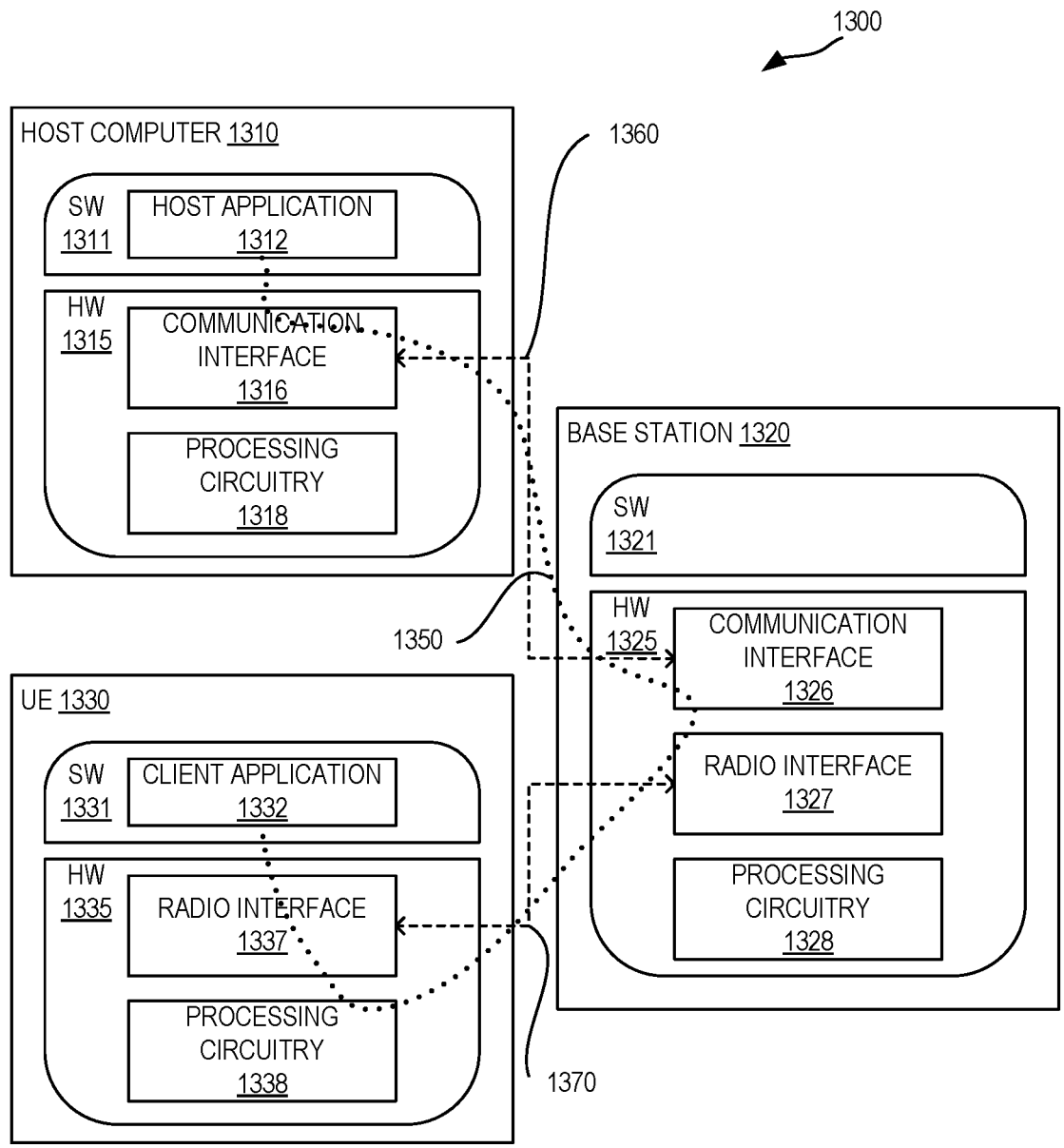
FIG. 13 illustrates the base station and host computer according to some embodiments of the present disclosure.

It is noted that the host computer 1310, the base station 1320, and the UE 1330 illustrated in FIG. 13 may be similar or identical to the host computer 1230, one of base stations 1212A, 1212B, 1212C, and one of UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve interference conditions in the RAN as a result of controlling or mitigating interference from, e.g., an aerial wireless device (e.g., a drone UE) and thereby provide benefits such as, e.g., improved data rates.

A measurement procedure may be provided for the purpose of monitoring data rate, latency, and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in the software 1311 and the hardware 1315 of the host computer 1310 or in the software 1331 and the hardware 1335 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing, etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency, and the like. The measurements may be implemented in that the software 1311 and 1331 causes messages to be transmitted, in particular empty or 'dummy' messages, using the OTT connection 1350 while it monitors propagation times, errors, etc.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
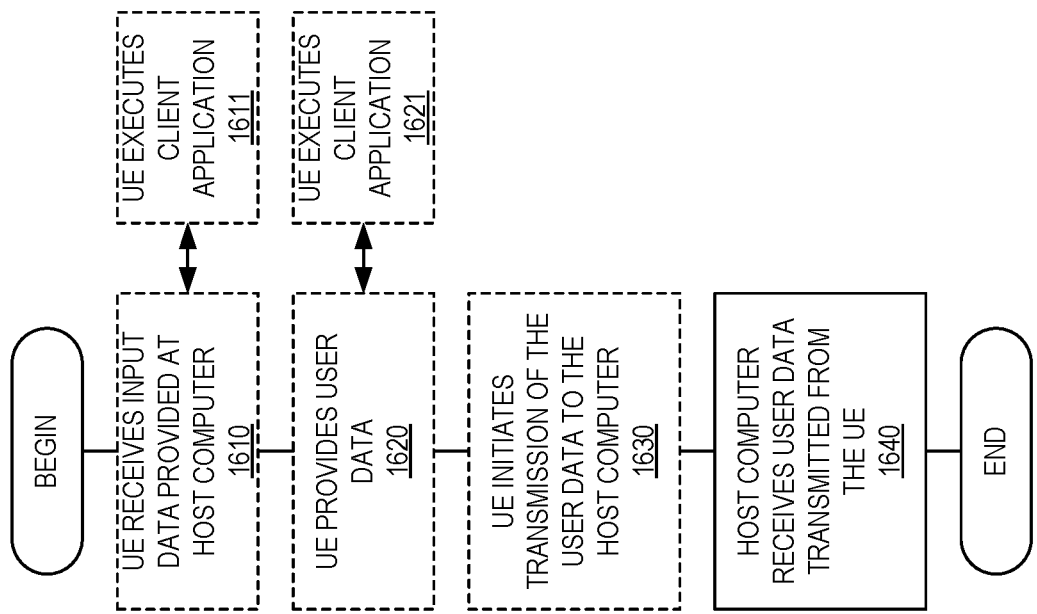
FIG. 16 illustrates a flowchart illustrating a method implemented in a communication system according to some embodiments of the present disclosure.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
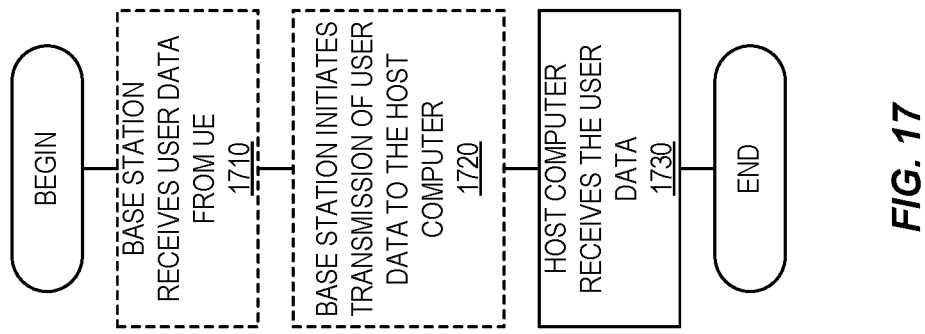
FIG. 17 illustrates a flowchart illustrating a method implemented in a communication system according to some embodiments of the present disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
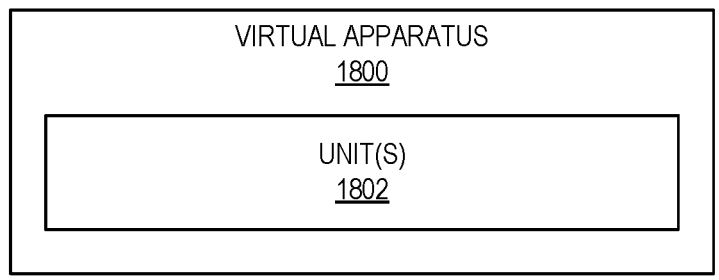
FIG. 18 illustrates a schematic block diagram of an apparatus in a wireless network (for example, the wireless network shown in FIG. 9) according to some embodiments of the present disclosure.

FIG. 18 illustrates a schematic block diagram of an apparatus 1800 in a wireless network (for example, the wireless network shown in FIG. 9). The apparatus may be implemented in a wireless device or network node (e.g., wireless device 910 or network node 960 shown in FIG. 9). The apparatus 1800 is operable to carry out the example method described with reference to FIG. 7 and/or FIG. 8 and possibly any other processes or methods disclosed herein. It is also to be understood that the method of FIG. 7 and/or FIG. 8 is not necessarily carried out solely by the apparatus 1800. At least some operations of the method can be performed by one or more other entities.

The virtual apparatus 1800 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. The virtual apparatus 1800 is an implementation of the network node 10 of FIG. 7 or FIG. 8, and the processing circuitry may be used to cause one or more units 1802 to perform the functions of the network node 10 described in FIG. 7 and/or FIG. 8. Using FIG. 7 as an example, the units 1802 include a configuring unit to configure a wireless device 12 to measure RSRP for both serving and neighbor cells, a receiving unit to receive the report(s) from the wireless device 12, an adjusting unit to adjust the target receive power for the wireless device 12, a determining unit to determine a new power correction for the wireless device 12, and a signaling unit to signal the new power correction to the wireless device 12. In some other embodiments, the virtual apparatus 1800 is an implementation of the wireless device 12 of FIG. 7 or FIG. 8, and the processing circuitry may be used to cause one or more units 1802 to perform the functions of the wireless device 12 described in FIG. 7 and/or FIG. 8. Using FIG. 7 as an example, the units 1802 include a receiving unit to receive the configuration from the network node 10, a performing unit to perform the RSRP measurements on the serving and neighbor cells, a generating unit to generate the report(s), a sending unit to send the report(s) to the network node 10, a second receiving unit to receive the power correction, and a determining and performing unit to determine the uplink transmit power based on the power correction and to perform uplink transmission in accordance with the determined uplink transmit power. The virtual apparatus 1800 may include any other suitable units of the apparatus 1800 to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

While not being limited thereto, some example embodiments of the present disclosure are provided below.

Embodiment 1: A network node (e.g., a base station) configured to communicate with a wireless device (e.g., a UE), the network node comprising a radio interface and processing circuitry configured to perform at least one of:
configure a wireless device to measure RSRP for both a serving cell of the wireless device and one or more neighbor cells of the wireless device;
receive, from the wireless device, reporting information comprising at least one of:
 a serving cell RSRP measurement for the serving cell of the wireless device and a neighbor cell RSRP measurement for a neighbor cell of the wireless device; or
 a RSRP difference between a serving cell RSRP measurement for the serving cell of the wireless device and a neighbor cell RSRP measurement for a neighbor cell of the wireless device; or
 a plurality of serving cell RSRP measurements for the serving cell of the wireless device and a plurality of neighbor cell RSRP measurements for a neighbor cell of the wireless device;
adjust a target receive power for the wireless device based on the reporting information;
determine a power correction for the wireless device based on the adjusted target receive power for the wireless device; and
provide the power correction to the wireless device.

Embodiment 2: The network node of embodiment 1 wherein the wireless device is attached to a drone or is a drone UE.

Embodiment 3: The network node of embodiment 1 or 2 wherein, in order to adjust the target receive power for the wireless device, the processing circuitry is further configured to perform at least one of: compute a value, $\Delta P_o$, based on the reporting information; and adjust the target receive power to a value $P_{o,new}=P_o-\Delta P_o$, where $P_o$ is an original target receive power for the wireless device.

Embodiment 4: The network node of embodiment 1 or 2 wherein, in order to adjust the target receive power for the wireless device, the processing circuitry is further configured to perform at least one of: compute a value, $\Delta P_o$, that is a function of the difference between the serving cell RSRP measurement and the neighbor cell RSRP measurement; and adjust the target receive power to a value $P_{o,new}=P_o-\Delta P_o$, where $P_o$ is an original target receive power for the wireless device.

Embodiment 5: The network node of embodiment 1 or 2 wherein, in order to adjust the target receive power for the wireless device, the processing circuitry is further configured to perform at least one of: compute a pathloss of the serving cell and a pathloss of the neighbor cell based on the reporting information; compute a value, $\Delta P_o$, as a function of a difference between the pathloss of the serving cell and the pathloss of the neighbor cell; and adjust the target receive power to a value $P_{o,new}=P_o-\Delta P_o$, where $P_o$ is an original target receive power for the wireless device.

Embodiment 6: The network node of embodiment 1 or 2 wherein, in order to adjust the target receive power for the wireless device, the processing circuitry is further configured to perform at least one of:

compute a value, $\Delta P_o$, as:

$$\Delta P_o = \alpha_{neib} \times \text{maximum}\{RSRP_{neib}(i), i=1,\ldots,K\}), \text{ or}$$

$$\Delta P_o = \alpha_{neib} \times \text{maximum}\{PL_{neib}(i), i=1,\ldots,K\}),$$

where $\alpha_{neib}$ is a scaling factor associated with a strongest neighbor cell that is used to compute the value $\Delta P_o$; and adjust the target receive power to a value $P_{o,new}=P_o-\Delta P_o$, where $P_o$ is an original target receive power for the wireless device.

Embodiment 7: The network node of embodiment 1 or 2 wherein, in order to adjust the target receive power for the wireless device, the processing circuitry is further configured to perform at least one of:

compute a value, $\Delta P_o$, as:

$$\Delta P_o = \Sigma_{i=1}^{Kmax} \alpha_{neib,i} \times RSRP_{neib}(i) \text{ or}$$

$$\Delta P_o = \Sigma_{i=1}^{Kmax} \alpha_{neib,i} \times PL_{neib}(i),$$

where $\alpha_{neib,i}$ is a scaling factor associated with the ith neighbor cell; and adjust the target receive power to a value $P_{o,new}=P_o-\Delta P_o$, where $P_o$ is an original target receive power for the wireless device.

Embodiment 7a: The network node of embodiment 1 wherein the configuring further comprises configuring a condition to be used by a wireless device for initiate a neighbor cell RSRP report.

Embodiment 7b: The network node of embodiment 7a wherein the condition is a threshold on a difference between a serving cell RSRP and a neighbor cell RSRP.

Embodiment 8: A communication system including a host computer comprising processing circuitry configured to provide user data and a communication interface configured to forward the user data to a cellular network for transmission to a wireless device, wherein the cellular network comprises a network node having a radio interface and processing circuitry, the network node's processing circuitry configured to perform at least one of:

configure a wireless device to measure RSRP for both a serving cell of the wireless device and one or more neighbor cells of the wireless device;

receive, from the wireless device, reporting information comprising:

a serving cell RSRP measurement for the serving cell of the wireless device and a neighbor cell RSRP measurement for a neighbor cell of the wireless device; or a RSRP difference between a serving cell RSRP measurement for the serving cell of the wireless device and a neighbor cell RSRP measurement for a neighbor cell of the wireless device; or a plurality of serving cell RSRP measurements for the serving cell of the wireless device and a plurality of neighbor cell RSRP measurements for a neighbor cell of the wireless device;

adjust a target receive power for the wireless device based on the reporting information;

determine a power correction for the wireless device based on the adjusted target receive power for the wireless device; and provide the power correction to the wireless device.

Embodiment 9: The communication system of embodiment 8, further including the network node.

Embodiment 10: The communication system of embodiment 9, further including the wireless device, wherein the wireless device is configured to communicate with the network node.

Embodiment 11: The communication system of embodiment 10, wherein the processing circuitry of the host computer is configured to execute a host application, thereby providing the user data and the wireless device comprises processing circuitry configured to execute a client application associated with the host application.

Embodiment 12: A method implemented in a network node in a wireless communication system, comprising at least one of:

configuring a wireless device to measure RSRP for both a serving cell of the wireless device and one or more neighbor cells of the wireless device;

receiving, from the wireless device, reporting information comprising at least one of:

a serving cell RSRP measurement for the serving cell of the wireless device and a neighbor cell RSRP measurement for a neighbor cell of the wireless device; or a RSRP difference between a serving cell RSRP measurement for the serving cell of the wireless device and a neighbor cell RSRP measurement for a neighbor cell of the wireless device; or a plurality of serving cell RSRP measurements for the serving cell of the wireless device and a plurality of neighbor cell RSRP measurements for a neighbor cell of the wireless device;

adjusting a target receive power for the wireless device based on the reporting information;

determining a power correction for the wireless device based on the adjusted target receive power for the wireless device; and providing the power correction to the wireless device.

Embodiment 13: The method of embodiment 12 wherein the wireless device is attached to a drone or is a drone UE.

Embodiment 14: The method of embodiment 12 or 13 wherein adjusting the target receive power for the wireless device comprises at least one of: computing a value, $\Delta P_o$, based on the reporting information; and adjusting the target receive power to a value $P_{o,new}=P_o-\Delta P_o$, where $P_o$ is an original target receive power for the wireless device.

Embodiment 15: The method of embodiment 12 or 13 wherein adjusting the target receive power for the wireless device comprises: computing a value, $\Delta P_o$, that is a function of the difference between the serving cell RSRP measurement and the neighbor cell RSRP measurement; and adjusting the target receive power to a value $P_{o,new}=P_o\Delta P_o$, where $P_o$ is an original target receive power for the wireless device.

Embodiment 16: The method of embodiment 12 or 13 wherein adjusting the target receive power for the wireless device comprises at least one of: computing a pathloss of the serving cell and a pathloss of the neighbor cell based on the reporting information; computing a value, $\Delta P_o$, as a function of a difference between the pathloss of the serving cell and the pathloss of the neighbor cell; and adjusting the target receive power to a value $P_{o,new}=P_o-\Delta P_o$, where $P_o$ is an original target receive power for the wireless device.

Embodiment 17: The method of embodiment 12 or 13 wherein adjusting the target receive power for the wireless device comprises at least one of:

computing a value, $\Delta P_o$, as:

$$\Delta P_o=\alpha_{neib}\times \text{maximum}\{RSRP_{neib}(i), i=1, \ldots, K\}), \text{ or}$$

$$\Delta P_o=\alpha_{neib}\times \text{maximum}\{PL_{neib}(i), i=1, \ldots, K\}),$$

where $\alpha_{neib}$ is a scaling factor associated with a strongest neighbor cell that is used to compute the value $\Delta P_o$; and adjusting the target receive power to a value $P_{o,new}=P_o-\Delta P_o$, where $P_o$ is an original target receive power for the wireless device.

Embodiment 18: The method of embodiment 12 or 13 wherein adjusting the target receive power for the wireless device comprises at least one of:

computing a value, $\Delta P_o$, as:

$$\Delta P_o=\Sigma_{i=1}^{Kmax}\alpha_{neib,i}\times RSRP_{neib}(i) \text{ or}$$

$$\Delta P_o=\Sigma_{i=1}^{Kmax}\alpha_{neib,i}\times PL_{neib}(i),$$

where $\alpha_{neib,i}$ is a scaling factor associated with the ith neighbor cell; and adjusting the target receive power to a value $P_{o,new}=P_o-\Delta P_o$, where $P_o$ is an original target receive power for the wireless device.

Embodiment 19: A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs at least one of:

configure a wireless device to measure RSRP for both a serving cell of the wireless device and one or more neighbor cells of the wireless device;

receive, from the wireless device, reporting information comprising at least one of:

a serving cell RSRP measurement for the serving cell of the wireless device and a neighbor cell RSRP measurement for a neighbor cell of the wireless device; or a RSRP difference between a serving cell RSRP measurement for the serving cell of the wireless device and a neighbor cell RSRP measurement for a neighbor cell of the wireless device; or a plurality of serving cell RSRP measurements for the serving cell of the wireless device and a plurality of neighbor cell RSRP measurements for a neighbor cell of the wireless device;

adjusts a target receive power for the wireless device based on the reporting information;

determines a power correction for the wireless device based on the adjusted target receive power for the wireless device; and provides the power correction to the wireless device.

Embodiment 20: The method of embodiment 19, further comprising, at the network node, transmitting the user data.

Embodiment 21: The method of embodiment 20, wherein the user data is provided at the host computer by executing a host application, the method further comprising, at the wireless device, executing a client application associated with the host application.

Embodiment 22: A wireless device (e.g., UE) configured to communicate with a network node (e.g., base station), the wireless device comprising a radio interface and processing circuitry configured to perform at least one of:

receive, from a network node, a configuration to measure RSRP for both a serving cell of the wireless device and one or more neighbor cells of the wireless device;

perform RSRP measurements on the serving cell and the one or more neighbor cells;

generate one or more report comprising reporting information, the reporting information comprising at least one of:

a serving cell RSRP measurement for the serving cell of the wireless device and a neighbor cell RSRP measurement for a neighbor cell of the wireless device; or a RSRP difference between a serving cell RSRP measurement for the serving cell of the wireless device and a neighbor cell RSRP measurement for a neighbor cell of the wireless device; or a plurality of serving cell RSRP measurements for the serving cell of the wireless device and a plurality of neighbor cell RSRP measurements for a neighbor cell of the wireless device;

receive, from the network node, a power correction;

determine an uplink transmit power for the wireless device based on the power correction; and perform uplink transmission in accordance with the determined uplink transmit power.

Embodiment 23: The network node of embodiment 22 wherein the wireless device is attached to a drone or is a drone UE.

Embodiment 24: A communication system including a host computer comprising processing circuitry configured to provide user data and a communication interface configured to forward user data to a cellular network for transmission to a wireless device, wherein the wireless device comprises a radio interface and processing circuitry, the wireless device's processing circuitry configured to perform at least one of:

receive, from a network node, a configuration to measure RSRP for both a serving cell of the wireless device and one or more neighbor cells of the wireless device;

perform RSRP measurements on the serving cell and the one or more neighbor cells;

generate one or more report comprising reporting information, the reporting information comprising at least one of:
  a serving cell RSRP measurement for the serving cell of the wireless device and a neighbor cell RSRP measurement for a neighbor cell of the wireless device; or
  a RSRP difference between a serving cell RSRP measurement for the serving cell of the wireless device and a neighbor cell RSRP measurement for a neighbor cell of the wireless device; or
  a plurality of serving cell RSRP measurements for the serving cell of the wireless device and a plurality of neighbor cell RSRP measurements for a neighbor cell of the wireless device;
receive, from the network node, a power correction;
determine an uplink transmit power for the wireless device based on the power correction; and
perform uplink transmission in accordance with the determined uplink transmit power.

Embodiment 25: The communication system of embodiment 24, further including the wireless device.

Embodiment 26: The communication system of embodiment 25, wherein the cellular network further includes a network node (e.g., a base station) configured to communicate with the wireless device.

Embodiment 27: The communication system of embodiment 25 or 26, wherein: the processing circuitry of the host computer is configured to execute a host application, thereby providing the user data; and the wireless device's processing circuitry is configured to execute a client application associated with the host application.

Embodiment 28: A method implemented in a wireless device (e.g., UE), comprising at least one of:
  receiving, from a network node, a configuration to measure RSRP for both a serving cell of the wireless device and one or more neighbor cells of the wireless device;
  performing RSRP measurements on the serving cell and the one or more neighbor cells;
  generating one or more report comprising reporting information, the reporting information comprising:
    a serving cell RSRP measurement for the serving cell of the wireless device and a neighbor cell RSRP measurement for a neighbor cell of the wireless device; or
    a RSRP difference between a serving cell RSRP measurement for the serving cell of the wireless device and a neighbor cell RSRP measurement for a neighbor cell of the wireless device; or
    a plurality of serving cell RSRP measurements for the serving cell of the wireless device and a plurality of neighbor cell RSRP measurements for a neighbor cell of the wireless device;
  receiving, from the network node, a power correction;
  determining an uplink transmit power for the wireless device based on the power correction; and
  performing uplink transmission in accordance with the determined uplink transmit power.

Embodiment 29: The method of embodiment 28 wherein the wireless device is attached or a drone or is a drone UE.

Embodiment 30: A method implemented in a communication system including a host computer, a network node (e.g., a base station) and a wireless device (e.g., a UE), the method comprising: at the host computer, providing user data; and at the host computer, initiating a transmission carrying the user data to the wireless device via a cellular network comprising the network node, wherein the wireless device performs at least one of:
  receives, from a network node, a configuration to measure RSRP for both a serving cell of the wireless device and one or more neighbor cells of the wireless device;
  performs RSRP measurements on the serving cell and the one or more neighbor cells;
  generates one or more report comprising reporting information, the reporting information comprising at least one of:
    a serving cell RSRP measurement for the serving cell of the wireless device and a neighbor cell RSRP measurement for a neighbor cell of the wireless device; or
    a RSRP difference between a serving cell RSRP measurement for the serving cell of the wireless device and a neighbor cell RSRP measurement for a neighbor cell of the wireless device; or
    a plurality of serving cell RSRP measurements for the serving cell of the wireless device and a plurality of neighbor cell RSRP measurements for a neighbor cell of the wireless device;
  receives, from the network node, a power correction;
  determines an uplink transmit power for the wireless device based on the power correction; and
  performs uplink transmission in accordance with the determined uplink transmit power.

Embodiment 31: The method of embodiment 30, further comprising, at the wireless device, receiving the user data from the network node.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
ACK Acknowledgement
ASIC Application Specific Integrated Circuit
ATM Asynchronous Transfer Mode
BSC Base Station Controller
BTS Base Transceiver Stations
CD Compact Disk
CDMA Code Division Multiple Access
COTS Commercial Off-the-Shelf
CPE Customer Premise Equipment
CPU Central Processing Units
D2D Device-to-Device
DAS Distributed Antenna System
dB Decibels
dBm Decibel-Milliwatt
DC Direct Current
DCI Downlink Control Information
DFT Discrete Fourier Transform
DIMM Dual In-line Memory Module
DSP Digital Signal Processor
DVD Digital Video Disk
EEPROM Electrically Erasable Programmable Read-Only Memory
eMTC Enhanced Machine Type Communication
eNB Enhanced or Evolved Node B
EPROM Erasable Programmable Read-Only Memory
E-SMLC Evolved Serving Mobile Location Center FDD Frequency Division Duplexing
FPGA Field Programmable Gate Array
GHz Gigahertz
gNB New Radio Base Station
GPS Global Positioning System
GSM Global System for Mobile Communications
HARQ Hybrid Automatic Repeat Request
HDDS Holographic Digital Data Storage
HD-DVD High Density Digital Video Disk
I/O Input/Output
IoT Internet of Things
IP Internet Protocol
km/h Kilometers per Hour
LAN Local Area Network
LEE Laptop-Embedded Equipment
LME Laptop-Mounted Equipment
LOS Line of Sight
LTE Long Term Evolution
M2M Machine-to-Machine
MANO Management and Orchestration
MCE Multi-cell/Multicast Coordination Entities
MCS Modulation and Coding Scheme
MDT Minimization and Drive Tests
MIMO Multiple Input Multiple Output
MME Mobility Management Entity
ms Millisecond
MSC Mobile Switching Center
MSR Multi-Standard Radio
MTC Machine Type Communication
NACK Negative Acknowledgement
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
OTT Over-The-Top
PDCCH Physical Downlink Control Channel
PL Pathloss
PRACH Physical Random Access Channel
PROM Programmable Read-Only Memory
PSTN Public Switched Telephone Network
PUCCH Physical Uplink Control Channel
PUSCH Physical Uplink Shared Channel
RAID Redundant Array of Independent Disks
RAM Random Access Memory
RAN Radio Access Network
RAT Radio Access Technology
RF Radio Frequency
RNC Radio Network Controllers
ROM Read-Only Memory
RRH Remote Radio Head
RRU Remote Radio Unit
RSRP Reference Signal Received Power
RUIM Removable User Identity Module
SDRAM Synchronous Dynamic Random Access Memory
SIM Subscriber Identity Module
SINR Signal to Interference plus Noise Ratio
SOC System on a Chip
SON Self-Organizing Network
SONET Synchronous Optical Networking
SRS Sounding Reference Signal
TCP Transmission Control Protocol
TPC Transmit Power Control
TS Technical Specification
UE User Equipment
UMTS Universal Mobile Telecommunications System
USB Universal Serial Bus
UTRAN Universal Terrestrial Radio Access Network
V2V Vehicle-to-Vehicle
V2X Vehicle-to-Everything
VMM Virtual Machine Monitor
VNE Virtual Network Element
VNF Virtual Network Function
VoIP Voice-Over Internet Protocol
WAN Wide-Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

REFERENCES

[1] R1-1708813, "System level performance and interference mitigation techniques for aerial vehicles" Qualcomm Incorporated, 3GPP RAN1 #89, Hangzhou, P.R. China 15-19 May 2017.
[2] TS 36.213 V14.3.0, Section 5.1, "Uplink power control"
[3] TS 36.213, Section 6.1, "Physical non-synchronized random access procedure"
[4] R1-1713889, "Initial views on interference mitigation schemes for aerials", NTT DOCOMO, 3GPP RAN1 #90, Prague, Czechia, 21-25 Aug. 2017
[5] R1-1714466, "Potential enhancements on interference mitigation", ZTE, 3GPP RAN1 #90, Prague, Czechia, 21-25 Aug. 2017

What is claimed is:

1. A network node for a cellular communications network configured to communicate with a wireless device, the network node comprising a radio interface and processing circuitry operable to:
  configure a wireless device to measure Reference Signal Received Power, RSRP, for both a serving cell of the wireless device and one or more neighbor cells of the wireless device;
  receive, from the wireless device, reporting information comprising:
    a serving cell RSRP measurement for the serving cell of the wireless device and a neighbor cell RSRP measurement for a neighbor cell of the wireless device; or
    a RSRP difference between a serving cell RSRP measurement for the serving cell of the wireless device and a neighbor cell RSRP measurement for a neighbor cell of the wireless device; or
    a plurality of serving cell RSRP measurements for the serving cell of the wireless device and a plurality of neighbor cell RSRP measurements for one or more neighbor cells of the wireless device;
  adjust a target receive power for the wireless device based on the reporting information;
  determine a power correction for the wireless device based on the adjusted target receive power for the wireless device; and
  signal the power correction to the wireless device.

2. A method implemented in a network node in a wireless communication system, comprising:

configuring a wireless device to measure Reference Signal Received Power, RSRP, for both a serving cell of the wireless device and one or more neighbor cells of the wireless device;

receiving, from the wireless device, reporting information comprising:
  a serving cell RSRP measurement for the serving cell of the wireless device and a neighbor cell RSRP measurement for a neighbor cell of the wireless device; or
  a RSRP difference between a serving cell RSRP measurement for the serving cell of the wireless device and a neighbor cell RSRP measurement for a neighbor cell of the wireless device; or
  a plurality of serving cell RSRP measurements for the serving cell of the wireless device and a plurality of neighbor cell RSRP measurements for one or more neighbor cells of the wireless device;

adjusting a target receive power for the wireless device based on the reporting information;

determining a power correction for the wireless device based on the adjusted target receive power for the wireless device; and signaling the power correction to the wireless device.

3. The method of claim 2 wherein the wireless device is attached to a drone or is a drone User Equipment, UE.

4. The method of claim 2 wherein adjusting the target receive power for the wireless device comprises:
  computing a value, $\Delta P_o$, based on the reporting information; and
  adjusting the target receive power to a value $P_{o,new}=P_o-\Delta P_o$, where $P_o$ is an original target receive power for the wireless device.

5. The method of claim 2 wherein adjusting the target receive power for the wireless device comprises:
  computing a value, $\Delta P_o$, that is a function of the difference between the serving cell RSRP measurement and the neighbor cell RSRP measurement; and
  adjusting the target receive power to a value $P_{o,new}=P_o-\Delta P_o$, where $P_o$ is an original target receive power for the wireless device.

6. The method of claim 2 wherein:
  the reporting information comprises the serving cell RSRP measurement for the serving cell of the wireless device and the neighbor cell RSRP measurement for a neighbor cell of the wireless device; and
  adjusting the target receive power for the wireless device comprises:
    computing a value, $\Delta P_o$, that is a function of a difference between the serving cell RSRP measurement and the neighbor cell RSRP measurement; and
    adjusting the target receive power to a value $P_{o,new}=P_o-\Delta P_o$, where $P_o$ is an original target receive power for the wireless device.

7. The method of claim 2 wherein:
  the reporting information comprises the RSRP difference between the serving cell RSRP measurement for the serving cell of the wireless device and the neighbor cell RSRP measurement for the neighbor cell of the wireless device;
  adjusting the target receive power for the wireless device comprises:
    computing a value, $\Delta P_o$, that is a function of the RSRP difference; and
    adjusting the target receive power to a value $P_{o,new}=P_o-\Delta P_o$, where $P_o$ is an original target receive power for the wireless device.

8. The method of claim 2 wherein adjusting the target receive power for the wireless device comprises:
  computing a pathloss of the serving cell and a pathloss of the neighbor cell based on the reporting information;
  computing a value, $\Delta P_o$, as a function of a difference between the pathloss of the serving cell and the pathloss of the neighbor cell; and
  adjusting the target receive power to a value $P_{o,new}=P_o-\Delta P_o$, where $P_o$ is an original target receive power for the wireless device.

9. The method of claim 2 wherein, adjusting the target receive power for the wireless device comprises:
  computing a pathloss of the serving cell and pathlosses of two or more neighbor cells based on the reporting information;
  computing a value, $\Delta P_O$, as a function of a pathloss difference, $\Delta PL$, where the pathloss difference, $\Delta PL$, is defined as: $\Delta PL = \text{maximum}\{PL_{neib}(i)-PL_{ser}, i=1, \ldots, K\}$ where $PL_{neib}(i)$ is the pathloss of an i-th neighbor cell of the two or more neighbor cells, $PL_{sev}$ is the pathloss of the serving cell, and K is the number of neighbor cells; and
  adjusting the target receive power to a value $P_{o,new}=P_o-\Delta P_O$, where $P_o$ is an original target receive power for the wireless device.

10. The method of claim 2 wherein adjusting the target receive power for the wireless device comprises:
  computing a value, $\Delta P_o$, as:

$\Delta P_o = \alpha_{neib} \times \text{maximum}\{RSRP_{neib}(i), i=1, \ldots, K\}$), or $\Delta P_o = \alpha_{neib} \times \text{maximum}\{PL_{neib}(i), i=1, \ldots, K\}$), where $\alpha_{neib}$ is a scaling factor associated with a strongest neighbor cell that is used to compute the value $\Delta P_o$, $RSRP_{neib}(i)$ is a RSRP measurement for an i-th neighbor cell of K neighbor cells of the wireless device, and $PL_{neib}(i)$ is a pathloss of the i-th neighbor cell of the K neighbor cells of the wireless device; and adjusting the target receive power to a value $P_{o,new}=P_o-\Delta P_o$, where $P_o$ is an original target receive power for the wireless device.

11. The method of claim 2 wherein:
  the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device; and
  adjusting the target receive power for the wireless device comprises:
    computing a value, $\Delta P_o$, as:

$\Delta P_o = \alpha_{neib} \times \text{maximum}\{RSRP_{neib}(i), i=1, \ldots, K\}$), where $\alpha_{neib}$ is a scaling factor associated with a strongest neighbor cell that is used to compute the value $\Delta P_o$, $RSRP_{neib}(i)$ is the neighbor cell RSRP measurement for an i-th neighbor cell of the neighbor cell and the one or more additional neighbor cells, and K is the number of neighbor cells; and adjusting the target receive power to a value $P_{o,new}=P_o-\Delta P_o$, where $P_o$ is an original target receive power for the wireless device.

12. The method of claim 2 wherein:
  the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device; and adjusting the target receive power for the wireless device comprises:

computing a pathloss of the serving cell, a pathloss of the neighbor cell, and a pathloss of each of the one or more additional neighbor cells based on the reporting information;

computing a value, $\Delta P_o$, as:

$\Delta P_o = \alpha_{neib} \times \text{maximum}\{PL_{neib}(i), i=1, \ldots, K\})$, where $\alpha_{neib}$ is a scaling factor associated with a strongest neighbor cell that is used to compute the value $\Delta P_o$, $PL_{neib}(i)$ is a pathloss of an i-th neighbor cell of the K neighbor cells of the wireless device, and K is the number of neighbor cells; and adjusting the target receive power to a value $P_{o,new} = P_o - \Delta P_o$, where $P_o$ is an original target receive power for the wireless device.

13. The method of claim 2 wherein adjusting the target receive power for the wireless device comprises:

computing a value, $\Delta P_o$, as:

$\Delta P_o = \Sigma_{i=1}^{Kmax} \alpha_{neib,i} \times RSRP_{neib}(i)$ or $\Delta P_o = \Sigma_{i=1}^{Kmax} \alpha_{neib,i} \times PL_{neib}(i)$ where $\alpha_{neib,i}$ is a scaling factor associated with the ith neighbor cell, $RSRP_{neib}(i)$ is a RSRP measurement for the i-th neighbor cell, and $PL_{neib}(i)$ is a pathloss of the i-th neighbor cell; and adjusting the target receive power to a value $P_{o,new} = P_o - \Delta P_o$, where $P_o$ is an original target receive power for the wireless device.

14. The method of claim 2 wherein:

the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device; and adjusting the target receive power for the wireless device comprises:

computing a value, $\Delta P_o$, as:

$\Delta P_o = \Sigma_{i=1}^{Kmax} \alpha_{neib,i} \times RSRP_{neib}(i)$, where $\alpha_{neib,i}$ is a scaling factor associated with the i-th neighbor cell, and $RSRP_{neib}(i)$ is a RSRP measurement for the i-th neighbor cell; and adjusting the target receive power to a value $P_{o,new} = P_o - \Delta P_o$, where $P_o$ is an original target receive power for the wireless device.

15. The method of claim 2 wherein:

the reporting information comprises the serving cell RSRP measurement for the serving cell of the wireless device, the neighbor cell RSRP measurement for the neighbor cell of the wireless device, and one or more additional neighbor cell RSRP measurements for one or more additional neighbor cells of the wireless device; and adjusting the target receive power for the wireless device comprises:

computing a value, $\Delta P_o$, as:

$\Delta P_o = \Sigma_{i=1}^{Kmax} \alpha_{neib,i} \times PL_{neib}(i)$, where $\alpha_{neib,i}$ is a scaling factor associated with the i-th neighbor cell, and $PL_{neib}(i)$ is a pathloss of the i-th neighbor cell; and adjusting the target receive power to a value $P_{o,new} = P_o - \Delta P_o$, where $P_o$ is an original target receive power for the wireless device.

16. The method of claim 2 wherein signaling the power correction comprises signaling the power correction to the wireless device via a physical uplink shared channel power control adjustment state $f_c(i)$ with accumulation enabled.

17. A wireless device configured to communicate with a network node, the wireless device comprising a radio interface and processing circuitry configured to:

receive, from a network node, a configuration to measure Reference Signal Received Power, RSRP, for both a serving cell of the wireless device and one or more neighbor cells of the wireless device;

perform RSRP measurements on the serving cell and the one or more neighbor cells;

generate one or more report comprising reporting information, the reporting information comprising:
  a serving cell RSRP measurement for the serving cell of the wireless device and a neighbor cell RSRP measurement for a neighbor cell of the wireless device; or
  a RSRP difference between a serving cell RSRP measurement for the serving cell of the wireless device and a neighbor cell RSRP measurement for a neighbor cell of the wireless device; or
  a plurality of serving cell RSRP measurements for the serving cell of the wireless device and a plurality of neighbor cell RSRP measurements for one or more neighbor cells of the wireless device;

receive, from the network node, a power correction based on an adjusted target receive power for the wireless device;

determine an uplink transmit power for the wireless device based on the power correction; and perform uplink transmission in accordance with the determined uplink transmit power.

18. A method implemented in a wireless device, comprising:

receiving, from a network node, a configuration to measure Reference Signal Received Power, RSRP, for both a serving cell of the wireless device and one or more neighbor cells of the wireless device;

performing RSRP measurements on the serving cell and the one or more neighbor cells;

generating one or more report comprising reporting information, the reporting information comprising:
  a serving cell RSRP measurement for the serving cell of the wireless device and a neighbor cell RSRP measurement for a neighbor cell of the wireless device; or
  a RSRP difference between a serving cell RSRP measurement for the serving cell of the wireless device and a neighbor cell RSRP measurement for a neighbor cell of the wireless device; or
  a plurality of serving cell RSRP measurements for the serving cell of the wireless device and a plurality of neighbor cell RSRP measurements for one or more neighbor cells of the wireless device;

receiving, from the network node, a power correction based on an adjusted target receive power for the wireless device;

determining an uplink transmit power for the wireless device based on the power correction; and performing uplink transmission in accordance with the determined uplink transmit power.

19. The method of claim 18 wherein the wireless device is attached to a drone or is a drone User Equipment, UE.

\* \* \* \* \*